(12) United States Patent
Shen

(10) Patent No.: US 11,589,266 B2
(45) Date of Patent: Feb. 21, 2023

(54) RESOURCE CONFIGURATION METHOD AND DEVICE, AND COMPUTER STORAGE MEDIUM

(71) Applicant: GUANGDONG OPPO MOBILE TELECOMMUNICATIONS CORP., LTD., Guangdong (CN)

(72) Inventor: Jia Shen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 316 days.

(21) Appl. No.: 16/988,020

(22) Filed: Aug. 7, 2020

(65) Prior Publication Data

US 2020/0367107 A1 Nov. 19, 2020

Related U.S. Application Data

(63) Continuation of application No. PCT/CN2018/075854, filed on Feb. 8, 2018.

(51) Int. Cl.
    H04W 28/20 (2009.01)
    H04W 72/04 (2009.01)

(52) U.S. Cl.
    CPC ......... *H04W 28/20* (2013.01); *H04W 72/042* (2013.01)

(58) Field of Classification Search
    CPC ............... H04W 28/20; H04W 72/042; H04W 72/0453; H04W 72/0493; H04W 72/1289; H04L 5/0098
    See application file for complete search history.

(56) References Cited

U.S. PATENT DOCUMENTS

10,736,091 B2 * 8/2020 Noh ............... H04L 5/0092
11,343,063 B2 * 5/2022 Takeda ............ H04L 5/0094
(Continued)

FOREIGN PATENT DOCUMENTS

CN 102149208 A 8/2011
CN 104168605 A 11/2014
(Continued)

OTHER PUBLICATIONS

MediaTek Inc.; "Remaining Details on Bandwidth Part Operation in NR"; 3GPP TSG RAN WG1 Meeting 90bis, R1-1718327; Prague, CZ; Oct. 9-13, 2017 (13 pages), (Year: 2017).*
(Continued)

Primary Examiner — Ayaz R Sheikh
Assistant Examiner — Tarell A Hampton

(57) ABSTRACT

A resource configuration method and device, and a computer storage medium are provided. The method includes: a terminal receives first control information transmitted by a network device, where a BWP which is currently activated by the terminal includes a first downlink BWP and a first uplink BWP, and the first control information includes first indication information which is used to indicate that a BWP to be activated is a second downlink BWP or a second uplink BWP; and the terminal determines whether the first downlink BWP, the first uplink BWP, the second downlink BWP and the second uplink BWP are simultaneously activatable, if the first downlink BWP, the first uplink BWP, the second downlink BWP and the second uplink BWP are simultaneously activatable, the terminal maintains the first downlink BWP and the first uplink BWP in an activated state while activating the second downlink BWP and the second uplink BWP.

12 Claims, 12 Drawing Sheets

---

A network device transmits first control information to a terminal, where a BWP which is currently activated by the terminal includes a first downlink BWP and a first uplink BWP, and the first control information includes first indication information which is used to indicate that a BWP to be activated is a second downlink BWP or a second uplink BWP, so that when it is determined that the first downlink BWP, the first uplink BWP, the second downlink BWP and the second uplink BWP are simultaneously activatable, the terminal maintains the first downlink BWP and the first uplink BWP in an activated state while activating the second downlink BWP and the second uplink BWP

301

(56) References Cited

U.S. PATENT DOCUMENTS

| | | | | |
|---|---|---|---|---|
| 2012/0113939 | A1* | 5/2012 | Kim | H04W 74/006 370/329 |
| 2019/0052432 | A1* | 2/2019 | Islam | H04L 5/0094 |
| 2019/0059078 | A1* | 2/2019 | Noh | H04L 5/0092 |
| 2019/0103954 | A1* | 4/2019 | Lee | H04W 72/042 |
| 2019/0104517 | A1* | 4/2019 | Park | H04W 72/0413 |
| 2019/0141742 | A1* | 5/2019 | Zhou | H04L 5/0094 |
| 2019/0150064 | A1* | 5/2019 | Chen | H04W 48/10 370/328 |
| 2020/0077432 | A1* | 3/2020 | Xiong | H04L 1/1825 |
| 2020/0178252 | A1* | 6/2020 | Li | H04W 72/1289 |
| 2020/0196285 | A1* | 6/2020 | Zhuang | H04L 5/0053 |
| 2020/0205134 | A1* | 6/2020 | Pan | H04L 1/00 |
| 2020/0213066 | A1* | 7/2020 | Ma | H04L 5/0092 |
| 2020/0295913 | A1* | 9/2020 | Takeda | H04L 5/0098 |
| 2021/0068147 | A1* | 3/2021 | Sato | H04W 72/14 |
| 2021/0092008 | A1* | 3/2021 | Yi | H04L 5/0005 |
| 2021/0194654 | A1* | 6/2021 | Zhang | H04L 5/0007 |
| 2021/0212025 | A1* | 7/2021 | Selvanesan | H04W 72/0446 |

FOREIGN PATENT DOCUMENTS

| | | |
|---|---|---|
| CN | 106455081 A | 2/2017 |
| WO | 2017093791 A1 | 6/2017 |

OTHER PUBLICATIONS

3rd Generation Partnership Project; Technical Specification Group Radio Access Network; NR; Physical layer procedures for control(Release 15).

The EESR of corresponding European application No 18904590.9, dated Dec. 2, 2020.

Huawei et al:"Remaining issues on bandwidth part", 3GPP Draft; R1-1717077, 3rd Generation Partership Project (3GPP), Mobile Competence Centre; 650, Route Des Lucioles; F-06921 Sophia-Antipolis Cedex; France, vol. RAN WG1, No. Prague, Czhech Republic; Oct. 9, 2017-Oct. 13, 2017 Oct. 8, 2017(Oct. 8, 2017), XP051340268.

ZTE:"Resource allocation for wideband operation", 3GPP Draft; R1-171026, 3rd Generation Partnership Project (3GPP), Mobile Competence Centre; 650, Route Des Lucioles, F-06921 Sophia-Antipolis Cedex; France, vol. RAN WG1, No. Qungdao, P. R. China; Jun. 27, 2017-Jun. 30, 2017 Jun. 26 2017(Jun. 26, 2017), XP051299350.

International Search Report(ISR) dated Nov. 1, 2018 for Application No. PCT/CN2018/075854.

International Search Report (ISR) dated Oct. 25, 2018 for Application No. PCT/CN2018/075838.

Written Opinion (WOSA) dated Oct. 25, 2018 for Application No. PCT/CN2018/075838.

The EESR of corresponding European application No. 18905197.2, dated Nov. 27, 2020.

Huawei, HiSilicon, Bandwidth part activation and adaptation, R1-1717905, 3GPP TSG RAN WG1 Meeting #90bis, Prague, Czech Republic, Oct. 9-13, 2017.

Guangdong OPPO Mobile Telecom, Bandwidth part configuration and frequency resource allocation,R1-1710164, 3GPP TSG RAN WG1 NR Ad-Hoc#2, Qingdao, P.R. China Jun. 27-30, 2017.

Intel Corporation,Overall impact in RAN2 for BWP, R2-1710592,3GPP TSG RAN WG2 Meeting #99bis, Prague, Czech Republic, Oct. 9-13, 2017.

Samsung, Wider Bandwidth Operations, R1-1710761, 3GPP TSG RAN WG1 NR Ad-Hoc#2, Qingdao, P.R. China Jun. 27-30, 2017.

* cited by examiner

A terminal receives first control information transmitted by a network device, where a BWP which is currently activated by the terminal includes a first downlink BWP and a first uplink BWP, and the first control information includes first indication information which is used to indicate that a BWP to be activated is a second downlink BWP or a second uplink BWP  — 201

The terminal determines whether the first downlink BWP, the first uplink BWP, the second downlink BWP and the second uplink BWP are simultaneously activatable, if the first downlink BWP, the first uplink BWP, the second downlink BWP and the second uplink BWP are simultaneously activatable, the terminal maintains the first downlink BWP and the first uplink BWP in an activated state while activating the second downlink BWP and the second uplink BWP  — 202

FIG. 2

A network device transmits first control information to a terminal, where a BWP which is currently activated by the terminal includes a first downlink BWP and a first uplink BWP, and the first control information includes first indication information which is used to indicate that a BWP to be activated is a second downlink BWP or a second uplink BWP, so that when it is determined that the first downlink BWP, the first uplink BWP, the second downlink BWP and the second uplink BWP are simultaneously activatable, the terminal maintains the first downlink BWP and the first uplink BWP in an activated state while activating the second downlink BWP and the second uplink BWP  — 301

FIG. 3

RESOURCE CONFIGURATION METHOD AND DEVICE, AND COMPUTER STORAGE MEDIUM

CROSS-REFERENCE TO RELATED APPLICATIONS

This application is a continuation of the International Application No. PCT/CN2018/075854, filed on Feb. 8, 2018, the content of which is incorporated herein by reference in its entirety.

TECHNICAL FIELD

The present application relates to the field of wireless communication technologies and, in particular, to a resource configuration method and device, and a computer storage medium.

BACKGROUND

In a long term evolution (LTE) system, frequency domain resources of a terminal are allocated in the entire system bandwidth. In a $5^{th}$ generation (5G) new radio (NR) system, a transmission bandwidth of the terminal may only occupy a part of the system bandwidth due to great improvement of the system bandwidth.

In current research on 5G NR, it has been decided to introduce a concept of bandwidth part (BWP) to achieve frequency domain resource allocation in a smaller range than the system bandwidth. A base station may configure multiple BWPs through radio resource control (RRC) signaling, and then dynamically activate a certain BWP in downlink control information (DCI). Each BWP is based on a numerology, where the numerology includes a subcarrier spacing and a cyclic prefix (CP). According to the current scheme, only one BWP can be activated for one terminal, and the original BWP is deactivated while a new BWP is activated.

As shown in FIG. 1, when BWP1 is in an activated state, if BWP2 is activated, BWP1 will be deactivated, if BWP1 is also deactivated, it will fall back to a default BWP.

The existing technical solution cannot support simultaneous activation of multiple BWPs, nor can it support simultaneous use of multiple numerologies, nor can it optimize, during concurrent transmission of multiple types of services, respective numerologies for different services. Moreover, if a switch is performed between two numerologies, then a switch between two BWPs will also be caused, resulting in conversion of a radio frequency bandwidth for the terminal, while such conversion of the radio frequency bandwidth will lead to the terminal's incapability of receiving or transmitting data for a period of time, thereby resulting in a waste of spectrum resources.

SUMMARY

To solve the above technical problem, embodiments of the present application provide a resource configuration method and device, and a computer storage medium.

A resource configuration method according to an embodiment of the present application includes:

receiving, by a terminal, first control information transmitted by a network device, where a BWP which is currently activated by the terminal includes a first downlink BWP and a first uplink BWP, and the first control information includes first indication information which is used to indicate that a BWP to be activated is a second downlink BWP or a second uplink BWP; and determining, by the terminal, whether the first downlink BWP, the first uplink BWP, the second downlink BWP and the second uplink BWP are simultaneously activatable, if the first downlink BWP, the first uplink BWP, the second downlink BWP and the second uplink BWP are simultaneously activatable, maintaining, by the terminal, the first downlink BWP and the first uplink BWP in an activated state while activating the second downlink BWP and the second uplink BWP.

In an embodiment of the present application, the method further includes:

if the first downlink BWP, the first uplink BWP, the second downlink BWP and the second uplink BWP are simultaneously unactivatable, deactivating, by the terminal, the first downlink BWP and the first uplink BWP while activating the second downlink BWP and the second uplink BWP.

In an embodiment of the present application, the determining, by the terminal, whether the first downlink BWP, the first uplink BWP, the second downlink BWP and the second uplink BWP are simultaneously activatable includes:

if the first downlink BWP, the first uplink BWP, the second downlink BWP, and the second uplink BWP satisfy a predetermined rule, determining, by the terminal, that the first downlink BWP, the first uplink BWP, the second downlink BWP and the second uplink BWP are simultaneously activatable;

if the first downlink BWP, the first uplink BWP, the second downlink BWP, and the second uplink BWP fail to satisfy a predetermined rule, determining, by the terminal, that the first downlink BWP, the first uplink BWP, the second downlink BWP and the second uplink BWP are simultaneously unactivatable.

In an embodiment of the present application, the first downlink BWP, the first uplink BWP, the second downlink BWP, and the second uplink BWP satisfy a predetermined rule, including:

the first downlink BWP is consistent with the second downlink BWP in terms of a center frequency and a bandwidth size, and the first uplink BWP is consistent with the second uplink BWP in terms of a center frequency and a bandwidth size; or, a frequency domain range of the second downlink BWP is within a frequency domain range of the first downlink BWP, and a frequency domain range of the second uplink BWP is within a frequency domain range of the first uplink BWP; or, the terminal has a radio frequency bandwidth capability capable of simultaneously covering frequency domain ranges of the first downlink BWP, the first uplink BWP, the second downlink BWP and the second uplink BWP.

In an embodiment of the present application, the determining, by the terminal, whether the first downlink BWP, the first uplink BWP, the second downlink BWP and the second uplink BWP are simultaneously activatable includes:

receiving, by the terminal, second control information transmitted by the network device, where the second control information includes second indication information which indicates whether the first downlink BWP, the first uplink BWP, the second downlink BWP and the second uplink BWP are simultaneously activatable.

In an embodiment of the present application, the second control information is DCI, or RRC signaling, or system information (SI, System Information).

In an embodiment of the present application, the method further includes:

receiving, by the terminal, first configuration information transmitted by the network device, where the first configuration information includes first duration information corresponding to the first downlink BWP and the first uplink BWP and/or second duration information corresponding to the second downlink BWP and the second uplink BWP; where the first duration information is used to enable the terminal to deactivate the first downlink BWP and the first uplink BWP when a duration in which the first downlink BWP and the first uplink BWP are activated reaches the first duration; and the second duration information is used to enable the terminal to deactivate the second downlink BWP and the second uplink BWP when a duration in which the second downlink BWP and the second uplink BWP are activated reaches the second duration; and based on the first configuration information, deactivating, by the terminal, the first downlink BWP and the first uplink BWP, and/or deactivating the second downlink BWP and the second uplink BWP.

In an embodiment of the present application, the method further includes:

receiving, by the terminal, third control information transmitted by the network device, where the third control information includes third indication information which is used to indicate that a BWP to be deactivated includes the first downlink BWP and the first uplink BWP, and/or, the second downlink BWP and the second uplink BWP; and based on the third control information, deactivating, by the terminal, the first downlink BWP and the first uplink BWP, and/or deactivating the second downlink BWP and the second uplink BWP.

In an embodiment of the present application, the method further includes:

when the first downlink BWP, the first uplink BWP, the second downlink BWP and the second uplink BWP are deactivated, activating a default BWP.

A resource configuration method according to an embodiment of the present application includes:

transmitting, by a network device, first control information to a terminal, where a BWP which is currently activated by the terminal includes a first downlink BWP and a first uplink BWP, and the first control information includes first indication information which is used to indicate that a BWP to be activated is a second downlink BWP or a second uplink BWP, so that when it is determined that the first downlink BWP, the first uplink BWP, the second downlink BWP and the second uplink BWP are simultaneously activatable, the terminal maintains the first downlink BWP and the first uplink BWP in an activated state while activating the second downlink BWP and the second uplink BWP.

In an embodiment of the present application, if the first downlink BWP, the first uplink BWP, the second downlink BWP and the second uplink BWP are simultaneously unactivatable, the first indication information is used to enable the terminal to deactivate the first downlink BWP and the first uplink BWP while activating the second downlink BWP and the second uplink BWP.

In an embodiment of the present application, whether the first downlink BWP, the first uplink BWP, the second downlink BWP and the second uplink BWP are simultaneously activatable, including:

if the first downlink BWP, the first uplink BWP, the second downlink BWP, and the second uplink BWP satisfy a predetermined rule, the first downlink BWP, the first uplink BWP, the second downlink BWP and the second uplink BWP are simultaneously activatable;

if the first downlink BWP, the first uplink BWP, the second downlink BWP, and the second uplink BWP fail to satisfy a predetermined rule, the first downlink BWP, the first uplink BWP, the second downlink BWP and the second uplink BWP are simultaneously unactivatable.

In an embodiment of the present application, the first downlink BWP, the first uplink BWP, the second downlink BWP, and the second uplink BWP satisfy a predetermined rule, including:

the first downlink BWP is consistent with the second downlink BWP in terms of a center frequency and a bandwidth size, and the first uplink BWP is consistent with the second uplink BWP in terms of a center frequency and a bandwidth size; or, a frequency domain range of the second downlink BWP is within a frequency domain range of the first downlink BWP, and a frequency domain range of the second uplink BWP is within a frequency domain range of the first uplink BWP; or, the terminal has a radio frequency bandwidth capability capable of simultaneously covering frequency domain ranges of the first downlink BWP, the first uplink BWP, the second downlink BWP and the second uplink BWP.

In an embodiment of the present application, the method further includes:

transmitting, by the network device, second control information to the terminal, where the second control information includes second indication information which indicates whether the first downlink BWP, the first uplink BWP, the second downlink BWP and the second uplink BWP are simultaneously activatable.

In an embodiment of the present application, the second control information is DCI, or RRC signaling, or SI.

In an embodiment of the present application, the method further includes:

transmitting, by the network device, first configuration information to the terminal, where the first configuration information includes first duration information corresponding to the first downlink BWP and the first uplink BWP and/or second duration information corresponding to the second downlink BWP and the second uplink BWP; where the first duration information is used to enable the terminal to deactivate the first downlink BWP and the first uplink BWP when a duration in which the first downlink BWP and the first uplink BWP are activated reaches the first duration; and the second duration information is used to enable the terminal to deactivate the second downlink BWP and the second uplink BWP when a duration in which the second downlink BWP and the second uplink BWP are activated reaches the second duration.

In an embodiment of the present application, the method further includes:

transmitting, by the network device, third control information to the terminal, where the third control information includes third indication information which is used to indicate that a BWP to be deactivated includes the first downlink BWP and the first uplink BWP, and/or, the second downlink BWP and the second uplink BWP.

A resource configuration device according to an embodiment of the present application includes:

a first receiving unit, configured to receive first control information transmitted by a network device, where a BWP which is currently activated by a terminal includes a first downlink BWP and a first uplink BWP, and the first control information includes first indication information which is used to indicate that a BWP to be activated is a second downlink BWP or a second uplink BWP;

a determining unit, configured to determine whether the first downlink BWP, the first uplink BWP, the second downlink BWP and the second uplink BWP are simultaneously activatable; and an activating and deactivating unit, configured to: if the first downlink BWP, the first uplink BWP, the second downlink BWP and the second uplink BWP are simultaneously activatable, maintain the first downlink BWP and the first uplink BWP in an activated state while activating the second downlink BWP and the second uplink BWP.

In an embodiment of the present application, the activating and deactivating unit is further configured to: if the first downlink BWP, the first uplink BWP, the second downlink BWP and the second uplink BWP are simultaneously unactivatable, deactivate the first downlink BWP and the first uplink BWP while activating the second downlink BWP and the second uplink BWP.

In an embodiment of the present application, the determining unit is configured to: if the first downlink BWP, the first uplink BWP, the second downlink BWP, and the second uplink BWP satisfy a predetermined rule, determine that the first downlink BWP, the first uplink BWP, the second downlink BWP and the second uplink BWP are simultaneously activatable; if the first downlink BWP, the first uplink BWP, the second downlink BWP, and the second uplink BWP fail to satisfy a predetermined rule, determine that the first downlink BWP, the first uplink BWP, the second downlink BWP and the second uplink BWP are simultaneously unactivatable.

In an embodiment of the present application, the first downlink BWP, the first uplink BWP, the second downlink BWP, and the second uplink BWP satisfy a predetermined rule, including:

the first downlink BWP is consistent with the second downlink BWP in terms of a center frequency and a bandwidth size, and the first uplink BWP is consistent with the second uplink BWP in terms of a center frequency and a bandwidth size; or, a frequency domain range of the second downlink BWP is within a frequency domain range of the first downlink BWP, and a frequency domain range of the second uplink BWP is within a frequency domain range of the first uplink BWP; or, the terminal has a radio frequency bandwidth capability capable of simultaneously covering frequency domain ranges of the first downlink BWP, the first uplink BWP, the second downlink BWP and the second uplink BWP.

In an embodiment of the present application, the device further includes:

a second receiving unit, configured to receive second control information transmitted by a network device, where the second control information includes second indication information which indicates whether the first downlink BWP, the first uplink BWP, the second downlink BWP and the second uplink BWP are simultaneously activatable;

the determining unit is configured to determine, based on the second control information, whether the first downlink BWP, the first uplink BWP, the second downlink BWP and the second uplink BWP are simultaneously activatable.

In an embodiment of the present application, the second control information is DCI, or RRC signaling, or SI.

In an embodiment of the present application, the device further includes:

a third receiving unit, configured to receive first configuration information transmitted by the network device, where the first configuration information includes first duration information corresponding to the first downlink BWP and the first uplink BWP and/or second duration information corresponding to the second downlink BWP and the second uplink BWP; where the first duration information is used to enable the terminal to deactivate the first downlink BWP and the first uplink BWP when a duration in which the first downlink BWP and the first uplink BWP are activated reaches the first duration; and the second duration information is used to enable the terminal to deactivate the second downlink BWP and the second uplink BWP when a duration in which the second downlink BWP and the second uplink BWP are activated reaches the second duration;

the activating and deactivating unit is further configured to deactivate, based on the first configuration information, the first downlink BWP and the first uplink BWP, and/or deactivate the second downlink BWP and the second uplink BWP.

In an embodiment of the present application, the device further includes:

a fourth receiving unit, configured to receive third control information transmitted by the network device, where the third control information includes third indication information which is used to indicate that a BWP to be deactivated includes the first downlink BWP and the first uplink BWP, and/or, the second downlink BWP and the second uplink BWP;

the activating and deactivating unit is further configured to deactivate, based on the third control information, the first downlink BWP and the first uplink BWP, and/or deactivate the second downlink BWP and the second uplink BWP.

In an embodiment of the present application, the activating and deactivating unit is further configured to: when the first downlink BWP, the first uplink BWP, the second downlink BWP and the second uplink BWP are deactivated, activate a default BWP.

A resource configuration device according to an embodiment of the present application includes:

a first transmitting unit, configured to transmit first control information to a terminal, where a BWP which is currently activated by the terminal includes a first downlink BWP and a first uplink BWP, and the first control information includes first indication information which is used to indicate that a BWP to be activated is a second downlink BWP or a second uplink BWP, so that when it is determined that the first downlink BWP, the first uplink BWP, the second downlink BWP and the second uplink BWP are simultaneously activatable, the terminal maintains the first downlink BWP and the first uplink BWP in an activated state while activating the second downlink BWP and the second uplink BWP.

In an embodiment of the present application, if the first downlink BWP, the first uplink BWP, the second downlink BWP and the second uplink BWP are simultaneously unactivatable, the first indication information is used to enable the terminal to deactivate the first downlink BWP and the first uplink BWP while activating the second downlink BWP and the second uplink BWP.

In an embodiment of the present application, whether the first downlink BWP, the first uplink BWP, the second downlink BWP and the second uplink BWP are simultaneously activatable, including:

if the first downlink BWP, the first uplink BWP, the second downlink BWP, and the second uplink BWP satisfy a predetermined rule, the first downlink BWP, the first uplink BWP, the second downlink BWP and the second uplink BWP are simultaneously activatable;

if the first downlink BWP, the first uplink BWP, the second downlink BWP, and the second uplink BWP fail to satisfy a predetermined rule, the first downlink BWP, the first uplink BWP, the second downlink BWP and the second uplink BWP are simultaneously unactivatable.

In an embodiment of the present application, the first downlink BWP, the first uplink BWP, the second downlink BWP, and the second uplink BWP satisfy a predetermined rule, including:

the first downlink BWP is consistent with the second downlink BWP in terms of a center frequency and a bandwidth size, and the first uplink BWP is consistent with the second uplink BWP in terms of a center frequency and a bandwidth size; or, a frequency domain range of the second downlink BWP is within a frequency domain range of the first downlink BWP, and a frequency domain range of the second uplink BWP is within a frequency domain range of the first uplink BWP; or, the terminal has a radio frequency bandwidth capability capable of simultaneously covering frequency domain ranges of the first downlink BWP, the first uplink BWP, the second downlink BWP and the second uplink BWP.

In an embodiment of the present application, the device further includes:

a second transmitting unit, configured to transmit second control information to the terminal, where the second control information includes second indication information which indicates whether the first downlink BWP, the first uplink BWP, the second downlink BWP and the second uplink BWP are simultaneously activatable.

In an embodiment of the present application, the second control information is DCI, or RRC signaling, or SI.

In an embodiment of the present application, the device further includes:

a third transmitting unit, configured to transmit first configuration information to the terminal, where the first configuration information includes first duration information corresponding to the first downlink BWP and the first uplink BWP and/or second duration information corresponding to the second downlink BWP and the second uplink BWP; where the first duration information is used to enable the terminal to deactivate the first downlink BWP and the first uplink BWP when a duration in which the first downlink BWP and the first uplink BWP are activated reaches the first duration; and the second duration information is used to enable the terminal to deactivate the second downlink BWP and the second uplink BWP when a duration in which the second downlink BWP and the second uplink BWP are activated reaches the second duration.

In an embodiment of the present application, the device further includes:

a fourth transmitting unit, configured to transmit third control information to the terminal, where the third control information includes third indication information which is used to indicate that a BWP to be deactivated includes the first downlink BWP and the first uplink BWP, and/or, the second downlink BWP and the second uplink BWP.

A computer storage medium stored with computer-executable instructions according to an embodiment of the present application, where the computer-executable instructions, when executed by a processor, implement a resource configuration method described above.

In the technical solutions according to the embodiments of the present application, a terminal receives first control information transmitted by a network device, where a BWP which is currently activated by the terminal includes a first downlink BWP and a first uplink BWP, and the first control information includes first indication information which is used to indicate that a BWP to be activated is a second downlink BWP or a second uplink BWP; and the terminal determines whether the first downlink BWP, the first uplink BWP, the second downlink BWP and the second uplink BWP are simultaneously activatable, if the first downlink BWP, the first uplink BWP, the second downlink BWP and the second uplink BWP are simultaneously activatable, the terminal maintains the first downlink BWP and the first uplink BWP in an activated state while activating the second downlink BWP and the second uplink BWP. By using the technical solutions according to the embodiments of the present application, a mode in which multiple BWP pairs can be simultaneously activated is introduced, that is, under certain conditions, a further BWP pair is used for signal transmission while a BWP pair is not deactivated, thereby flexibly supporting simultaneous transmission of multiple types of services, and improving scheduling flexibility and spectrum utilization of the system.

BRIEF DESCRIPTION OF DRAWING

Description of the drawings herein is intended to provide further comprehension of the present application, which constitutes a part of the present application. Exemplary embodiments of the present application and their description are used to explain the present application, but do not constitute an undue limitation on the present application. In the drawings:

FIG. 2 is a first schematic flowchart of a resource configuration method according to an embodiment of the present application;

FIG. 3 is a second schematic flowchart of a resource configuration method according to an embodiment of the present application;

DESCRIPTION OF EMBODIMENTS

Figure 1:
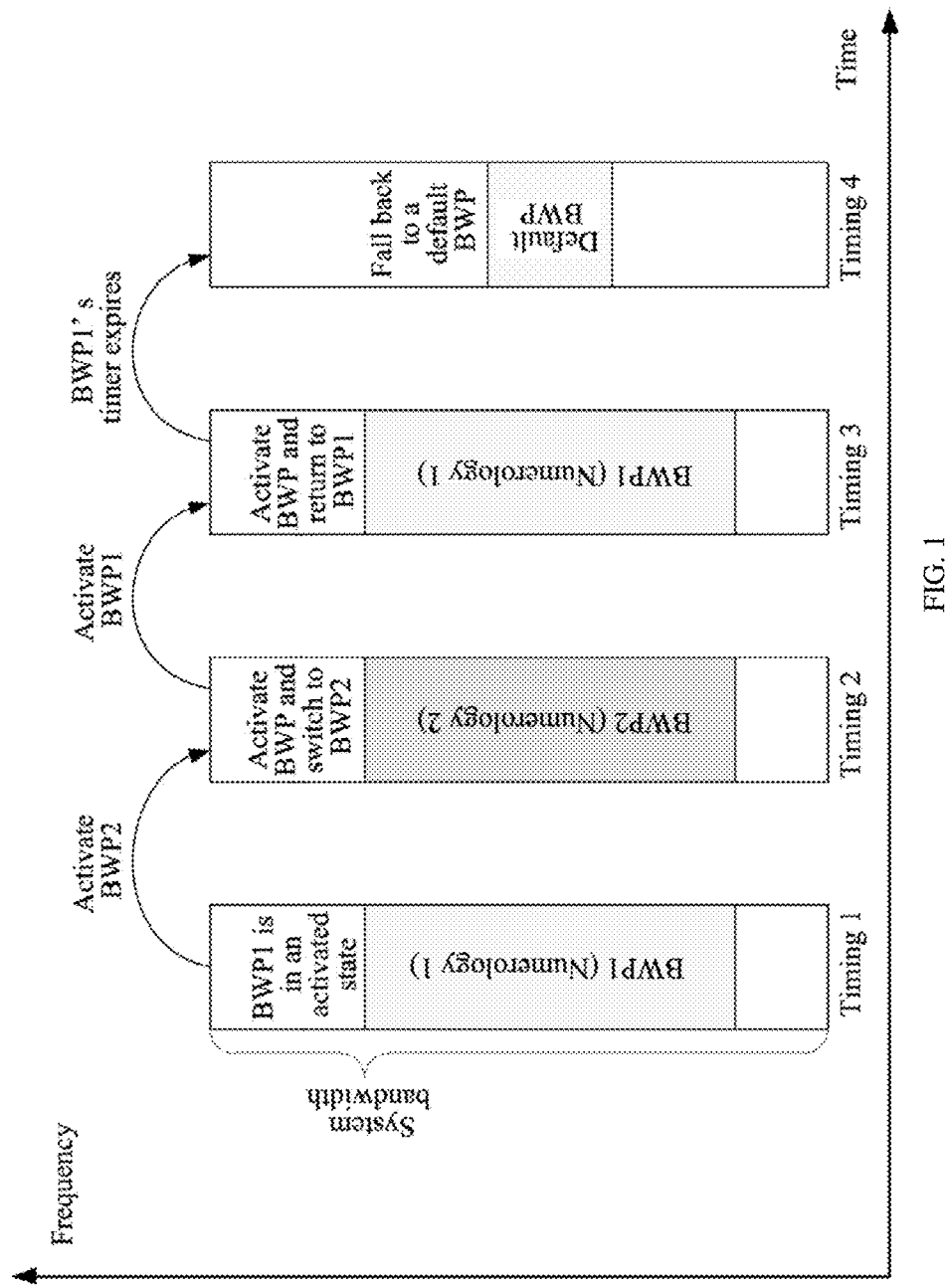
FIG. 1 is a schematic diagram showing that only one BWP can be in an activated state.

In order to understand features and technical contents of the embodiments of the present application in more details, implementation of the embodiments of the present application will be described hereunder in detail with reference to the drawings. The accompanying drawings are only for reference, but are not intended to limit the embodiments of the present application.

FIG. 2 is a first schematic flowchart of a resource configuration method according to an embodiment of the present application. As shown in FIG. 2, the resource configuration method includes the following steps:

Step 201, a terminal receives first control information transmitted by a network device, where a BWP which is currently activated by the terminal includes a first downlink BWP and a first uplink BWP, and the first control information includes first indication information which is used to indicate that a BWP to be activated is a second downlink BWP or a second uplink BWP.

In an embodiment of the present application, the terminal may be any device that can communicate with a network, such as a mobile phone, a tablet computer, a notebook computer, or a desktop computer.

In an embodiment of the present application, the network device may be a base station, such as a gNB of a 5G system.

In an embodiment of the present application, the first control information is DCI or media access control control element (MAC CE).

Step 202, the terminal determines whether the first downlink BWP, the first uplink BWP, the second downlink BWP and the second uplink BWP are simultaneously activatable, if the first downlink BWP, the first uplink BWP, the second downlink BWP and the second uplink BWP are simultaneously activatable, the terminal maintains the first downlink BWP and the first uplink BWP in an activated state while activating the second downlink BWP and the second uplink BWP.

For instance, a currently activated BWP of a terminal includes a downlink BWP1 and an uplink BWP1, the terminal receives first control information from a network device, where the first control information includes indication information for activating a downlink BWP2 or an uplink BWP2, if the downlink BWP1, the uplink BWP1, the downlink BWP2 and the uplink BWP2 are simultaneously activatable, the downlink BWP1 and the uplink BWP1 are maintained in an activated state while the downlink BWP2 and the uplink BWP2 are activated.

In an embodiment of the present application, if the first downlink BWP, the first uplink BWP, the second downlink BWP and the second uplink BWP are simultaneously unactivatable, the terminal deactivates the first downlink BWP and the first uplink BWP while activating the second downlink BWP and the second uplink BWP.

In an embodiment of the present application, the terminal determining whether the first downlink BWP, the first uplink BWP, the second downlink BWP and the second uplink BWP are simultaneously activatable may be implemented by the following modes:

Mode 1: if the first downlink BWP, the first uplink BWP, the second downlink BWP, and the second uplink BWP satisfy a predetermined rule, the terminal determines that the first downlink BWP, the first uplink BWP, the second downlink BWP and the second uplink BWP are simultaneously activatable; if the first downlink BWP, the first uplink BWP, the second downlink BWP, and the second uplink BWP fail to satisfy a predetermined rule, the terminal determines that the first downlink BWP, the first uplink BWP, the second downlink BWP and the second uplink BWP are simultaneously unactivatable.

In an embodiment of the present application, the first downlink BWP, the first uplink BWP, the second downlink BWP, and the second uplink BWP satisfy a predetermined rule, including at least one of the following:

1) the first downlink BWP is consistent with the second downlink BWP in terms of a center frequency and a bandwidth size, and the first uplink BWP is consistent with the second uplink BWP in terms of a center frequency and a bandwidth size;

2) a frequency domain range of the second downlink BWP is within a frequency domain range of the first downlink BWP, and a frequency domain range of the second uplink BWP is within a frequency domain range of the first uplink BWP; and 3) the terminal has a radio frequency bandwidth capability capable of simultaneously covering frequency domain ranges of the first downlink BWP, the first uplink BWP, the second downlink BWP and the second uplink BWP.

Mode 2: the terminal receives second control information transmitted by the network device, where the second control information includes second indication information which indicates whether the first downlink BWP, the first uplink BWP, the second downlink BWP and the second uplink BWP are simultaneously activatable.

In an implementation, the second control information is DCI, or RRC signaling, or SI.

In an embodiment of the present application, the terminal may deactivate a BWP which has been in an activated state through the following modes:

Mode 1: the terminal receives first configuration information transmitted by the network device, where the first configuration information includes first duration information corresponding to the first downlink BWP and the first uplink BWP and/or second duration information corresponding to the second downlink BWP and the second uplink BWP; where the first duration information is used to enable the terminal to deactivate the first downlink BWP and the first uplink BWP when a duration in which the first downlink BWP and the first uplink BWP are activated reaches the first duration; and the second duration information is used to enable the terminal to deactivate the second downlink BWP and the second uplink BWP when a duration in which the second downlink BWP and the second uplink BWP are activated reaches the second duration; and based on the first configuration information, the terminal deactivates the first downlink BWP and the first uplink BWP, and/or deactivates the second downlink BWP and the second uplink BWP.

For instance, when one of a timer timer1 for the downlink BWP1 and the uplink BWP1 and a timer timer2 for the downlink BWP2 and the uplink BWP2 expires, corresponding BWPs are deactivated.

Mode 2: the terminal receives third control information transmitted by the network device, where the third control information includes third indication information which is used to indicate that a BWP to be deactivated includes the first downlink BWP and the first uplink BWP, and/or, the second downlink BWP and the second uplink BWP; and based on the third control information, the terminal deactivates the first downlink BWP and the first uplink BWP, and/or deactivates the second downlink BWP and the second uplink BWP.

For instance, the terminal receives third control information, where the third control information includes indication information for deactivating the downlink BWP1 and the uplink BWP1, and/or, the downlink BWP2 and the uplink BWP2, and corresponding BWPs are deactivated.

In an implementation, when the first downlink BWP, the first uplink BWP, the second downlink BWP and the second uplink BWP are deactivated, a default BWP is activated.

For instance, when the downlink BWP1, the uplink BWP1, the downlink BWP2, and the uplink BWP2 are all deactivated, an activated BWP changes to a default BWP.

FIG. 3 is a second schematic flowchart of a resource configuration method according to an embodiment of the present application. As shown in FIG. 3, the resource configuration method includes the following steps:

Step 301, a network device transmits first control information to a terminal, where a BWP which is currently activated by the terminal includes a first downlink BWP and a first uplink BWP, and the first control information includes first indication information which is used to indicate that a BWP to be activated is a second downlink BWP or a second uplink BWP, so that when it is determined that the first downlink BWP, the first uplink BWP, the second downlink BWP and the second uplink BWP are simultaneously activatable, the terminal maintains the first downlink BWP and the first uplink BWP in an activated state while activating the second downlink BWP and the second uplink BWP.

In an embodiment of the present application, if the first downlink BWP, the first uplink BWP, the second downlink BWP and the second uplink BWP are simultaneously unactivatable, the first indication information is used to enable the terminal to deactivate the first downlink BWP and the first uplink BWP while activating the second downlink BWP and the second uplink BWP.

In an embodiment of the present application, whether the first downlink BWP, the first uplink BWP, the second downlink BWP and the second uplink BWP are simultaneously activatable, this may be determined by the following modes:

Mode 1: if the first downlink BWP, the first uplink BWP, the second downlink BWP, and the second uplink BWP satisfy a predetermined rule, the first downlink BWP, the first uplink BWP, the second downlink BWP and the second uplink BWP are simultaneously activatable; if the first downlink BWP, the first uplink BWP, the second downlink BWP, and the second uplink BWP fail to satisfy a predetermined rule, the first downlink BWP, the first uplink BWP, the second downlink BWP and the second uplink BWP are simultaneously unactivatable.

In an implementation, the first downlink BWP, the first uplink BWP, the second downlink BWP, and the second uplink BWP satisfy a predetermined rule, including:

the first downlink BWP is consistent with the second downlink BWP in terms of a center frequency and a bandwidth size, and the first uplink BWP is consistent with the second uplink BWP in terms of a center frequency and a bandwidth size; or, a frequency domain range of the second downlink BWP is within a frequency domain range of the first downlink BWP, and a frequency domain range of the second uplink BWP is within a frequency domain range of the first uplink BWP; or, the terminal has a radio frequency bandwidth capability capable of simultaneously covering frequency domain ranges of the first downlink BWP, the first uplink BWP, the second downlink BWP and the second uplink BWP.

Mode 2: the network device transmits second control information to the terminal, where the second control information includes second indication information which indicates whether the first downlink BWP, the first uplink BWP, the second downlink BWP and the second uplink BWP are simultaneously activatable.

In an implementation, the second control information is DCI, or RRC signaling, or SI.

In an implementation, the method further includes: the network device transmits first configuration information to the terminal, where the first configuration information includes first duration information corresponding to the first downlink BWP and the first uplink BWP and/or second duration information corresponding to the second downlink BWP and the second uplink BWP; where the first duration information is used to enable the terminal to deactivate the first downlink BWP and the first uplink BWP when a duration in which the first downlink BWP and the first uplink BWP are activated reaches the first duration; and the second duration information is used to enable the terminal to deactivate the second downlink BWP and the second uplink BWP when a duration in which the second downlink BWP and the second uplink BWP are activated reaches the second duration.

In an implementation, the method further includes: the network device transmits third control information to the terminal, where the third control information includes third indication information which is used to indicate that a BWP to be deactivated includes the first downlink BWP and the first uplink BWP, and/or, the second downlink BWP and the second uplink BWP The technical solutions according to the embodiments of the present application will be further described hereunder in conjunction with specific application examples.

Example 1: DL BWP1 is Consistent with DL BWP2 in Terms of a Center Frequency and a Bandwidth Size, UL BWP1 is Consistent with UL BWP2 in Terms of a Center Frequency and a Bandwidth Size, and BWP2 is Deactivated Before BWP1

Figure 4:
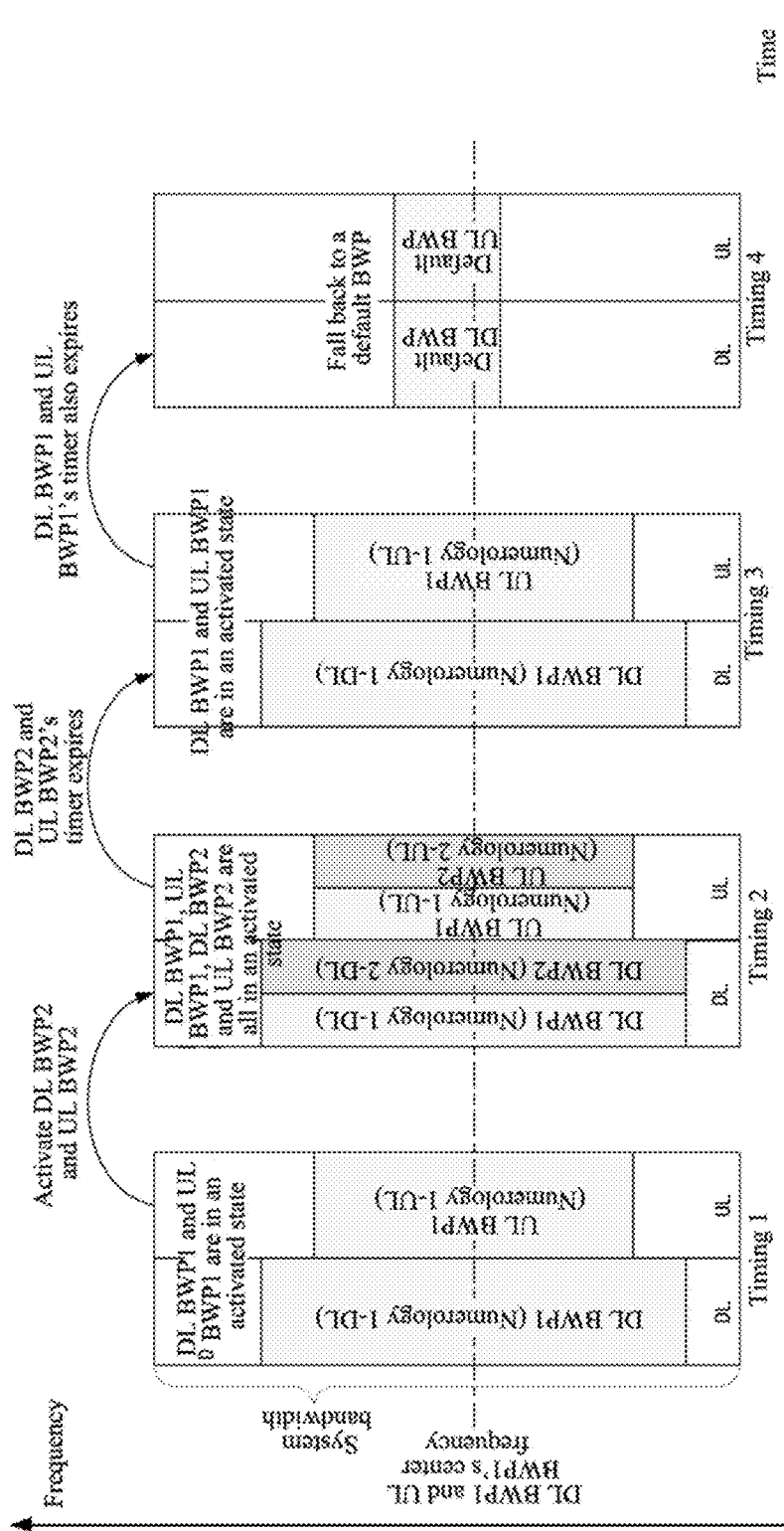
FIG. 4 is a schematic diagram of Example 1 of the present application.

As shown in FIG. 4, unlike the scheme in the prior art, when DL BWP1 and UL BWP1 are in an activated state, if DL BWP2 and UL BWP2 are activated, since DL BWP2 is consistent with DL BWP1 in terms of a center frequency and a bandwidth, and UL BWP2 is consistent with UL BWP1 in terms of a center frequency and a bandwidth, the terminal's radio frequency bandwidth and center frequency can still not be adjusted, thus DL BWP1 and UL BWP1 will not be deactivated, and DL BWP1, UL BWP1, DL BWP2 and UL BWP2 are all in an activated state. When DL BWP2 and UL BWP2 are deactivated (for instance, the timer for DL BWP2 and UL BWP2 expires), return to a state where only DL BWP1 and UL BWP 1 are activated. When DL BWP1 and UL BWP 1 are also deactivated (for instance, the timer for DL BWP1 and UL BWP1 expires), they will fall back to a default DL BWP and a default UL BWP.

With the new technical solution, two numerologies can be supported simultaneously without adjusting the terminal's radio frequency bandwidth and center frequency, thereby flexibly supporting simultaneous transmission of multiple types of services, and improving scheduling flexibility and spectrum utilization of the system.

Example 2: DL BWP1 is Consistent with DL BWP2 in Terms of a Center Frequency and a Bandwidth Size, UL BWP1 is Consistent with UL BWP2 in Terms of a Center Frequency and a Bandwidth Size, and BWP1 is Deactivated Before BWP2

Figure 5:
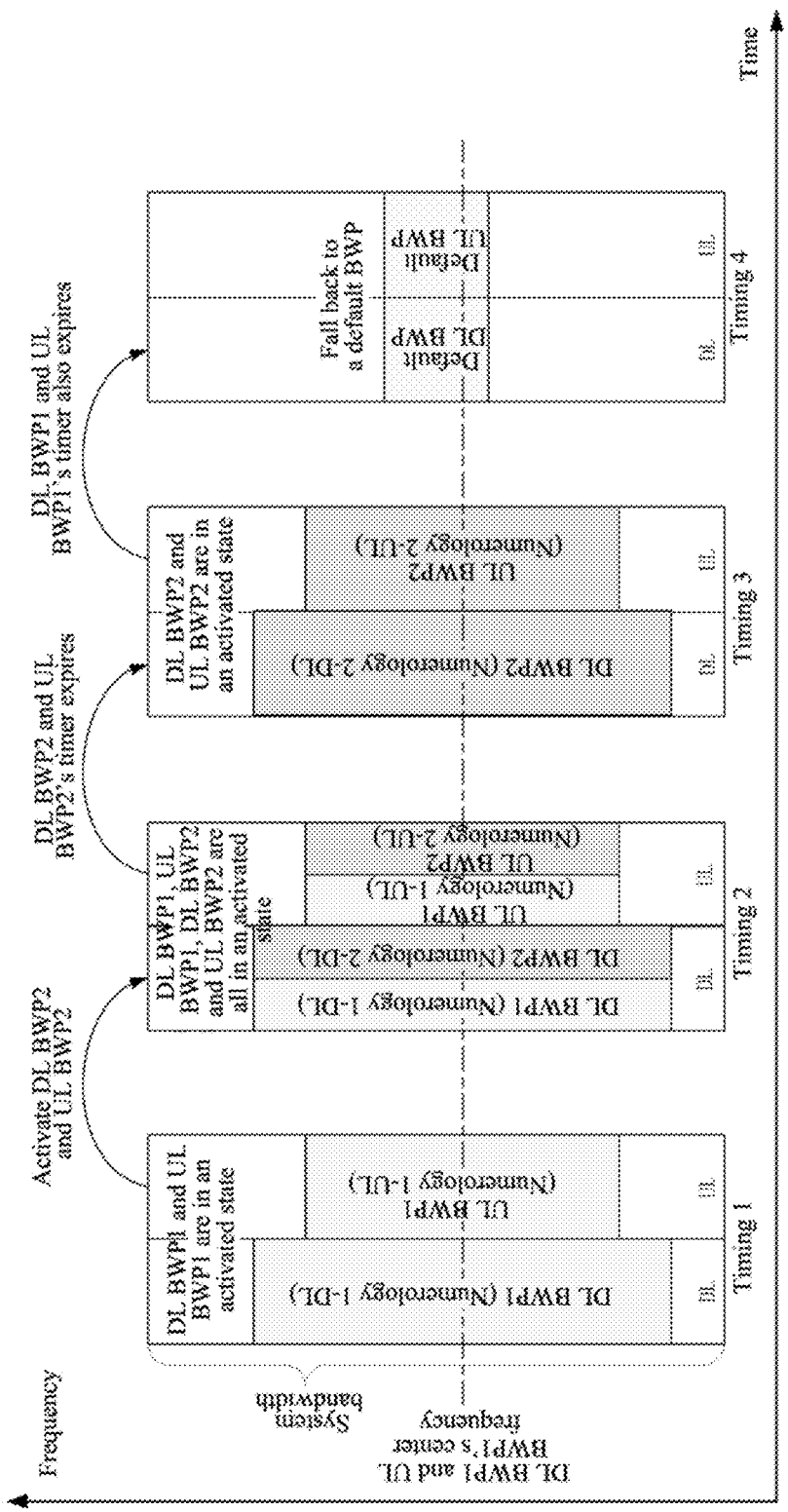
FIG. 5 is a schematic diagram of Example 2 of the present application.

As shown in FIG. 5, unlike the scheme in the prior art, when DL BWP1 and UL BWP1 are in an activated state, if DL BWP2 and UL BWP2 are activated, since DL BWP2 is consistent with DL BWP1 in terms of a center frequency and a bandwidth, and UL BWP2 is consistent with UL BWP1 in terms of a center frequency and a bandwidth, the terminal's radio frequency bandwidth and center frequency can still not be adjusted, thus DL BWP1 and UL BWP1 will not be deactivated, and DL BWP1, UL BWP1, DL BWP2 and UL BWP2 are all in an activated state. Different from Example 1, in this example: DL BWP1 and UL BWP 1 are deactivated before DL BWP2 and UL BWP2 (for instance, the timer for DL BWP1 and UL BWP1 expires), then enter a state in which only DL BWP2 and UL BWP2 are activated. When DL BWP2 and UL BWP2 are also deactivated (for instance, the timer for DL BWP2 and UL BWP2 expires), they will fall back to a default DL BWP and a default UL BWP.

With the new technical solution, two numerologies can be supported simultaneously without adjusting the terminal's radio frequency bandwidth and center frequency, thereby flexibly supporting simultaneous transmission of multiple types of services, and improving scheduling flexibility and spectrum utilization of the system.

Example 3: DL BWP1 is Consistent with DL
BWP2 in Terms of a Center Frequency and DL
BWP2 has a Bandwidth Less than that of DL
BWP1, UL BWP1 is Consistent with UL BWP2 in
Terms of a Center Frequency and UL BWP2 has a
Bandwidth Less than that of UL BWP1, and BWP2
is Deactivated Before BWP1

Figure 6:
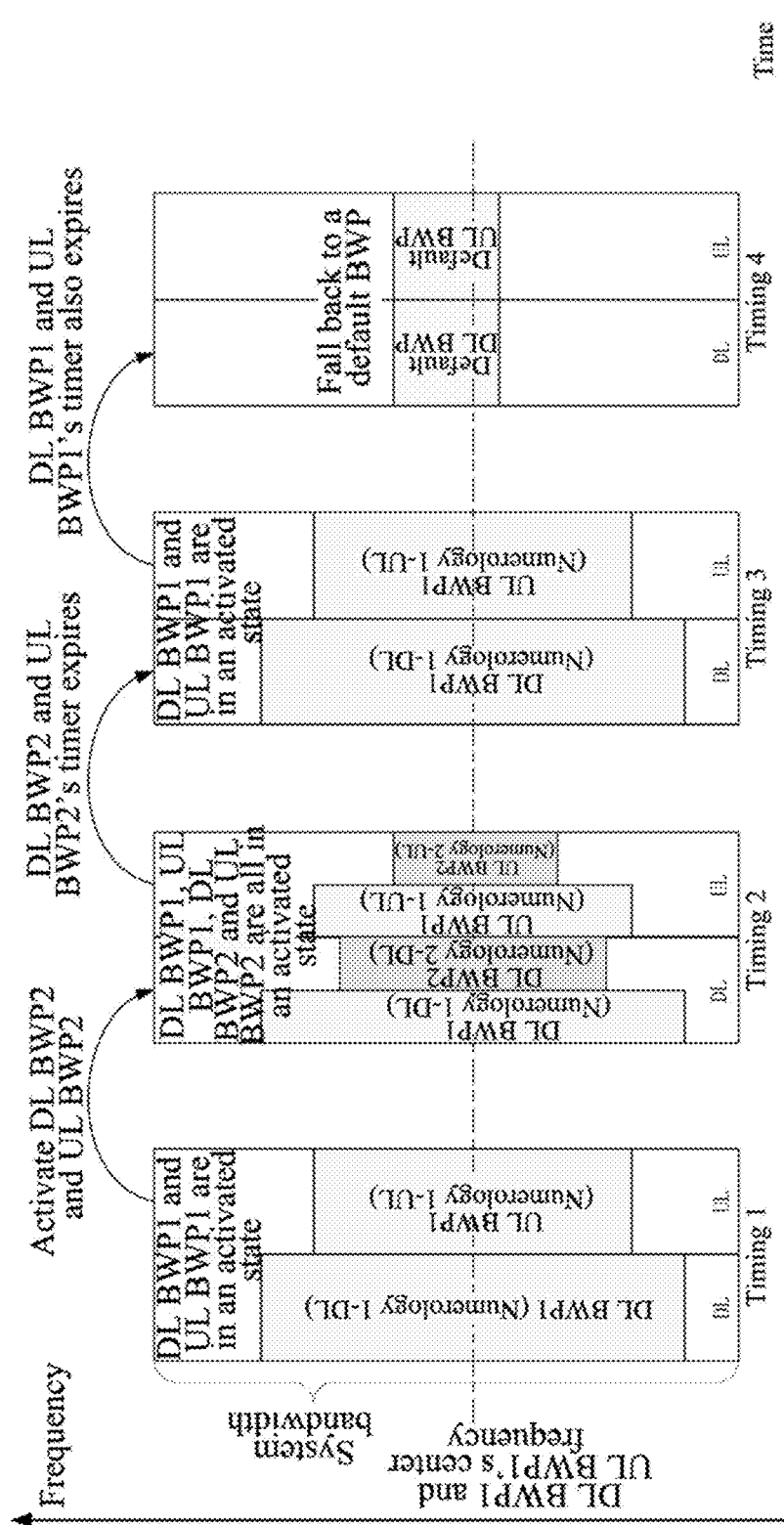
FIG. 6 is a schematic diagram of Example 3 of the present application.

As shown in FIG. 6, unlike the scheme in the prior art, when DL BWP1 and UL BWP1 are in an activated state, if DL BWP2 and UL BWP2 are activated, since DL BWP2 is consistent with DL BWP1 in terms of a center frequency and DL BWP2 has a bandwidth less than that of DL BWP1, and UL BWP2 is consistent with UL BWP1 in terms of a center frequency and UL BWP2 has a bandwidth less than that of UL BWP1, the terminal's radio frequency bandwidth and center frequency can still not be adjusted, thus DL BWP1 and UL BWP 1 will not be deactivated, and DL BWP1, UL BWP 1, DL BWP2 and UL BWP2 are all in an activated state. When DL BWP2 and UL BWP2 are deactivated (for instance, the timer for DL BWP2 and UL BWP2 expires), return to a state where only DL BWP1 and UL BWP 1 are activated. When DL BWP1 and UL BWP 1 are also deactivated (for instance, the timer for DL BWP1 and UL BWP1 expires), they will fall back to a default DL BWP and a default UL BWP.

With the new technical solution, two numerologies and/or two bandwidths can be supported simultaneously without adjusting the terminal's radio frequency bandwidth and center frequency, thereby flexibly supporting simultaneous transmission of multiple types of services, and improving scheduling flexibility and spectrum utilization of the system.

Example 4: DL BWP1 is Consistent with DL
BWP2 in Terms of a Center Frequency and DL
BWP2 has a Bandwidth Less than that of DL
BWP1, UL BWP1 is Consistent with UL BWP2 in
Terms of a Center Frequency and UL BWP2 has a
Bandwidth Less than that of UL BWP1, and BWP1
is Deactivated Before BWP2

Figure 7:
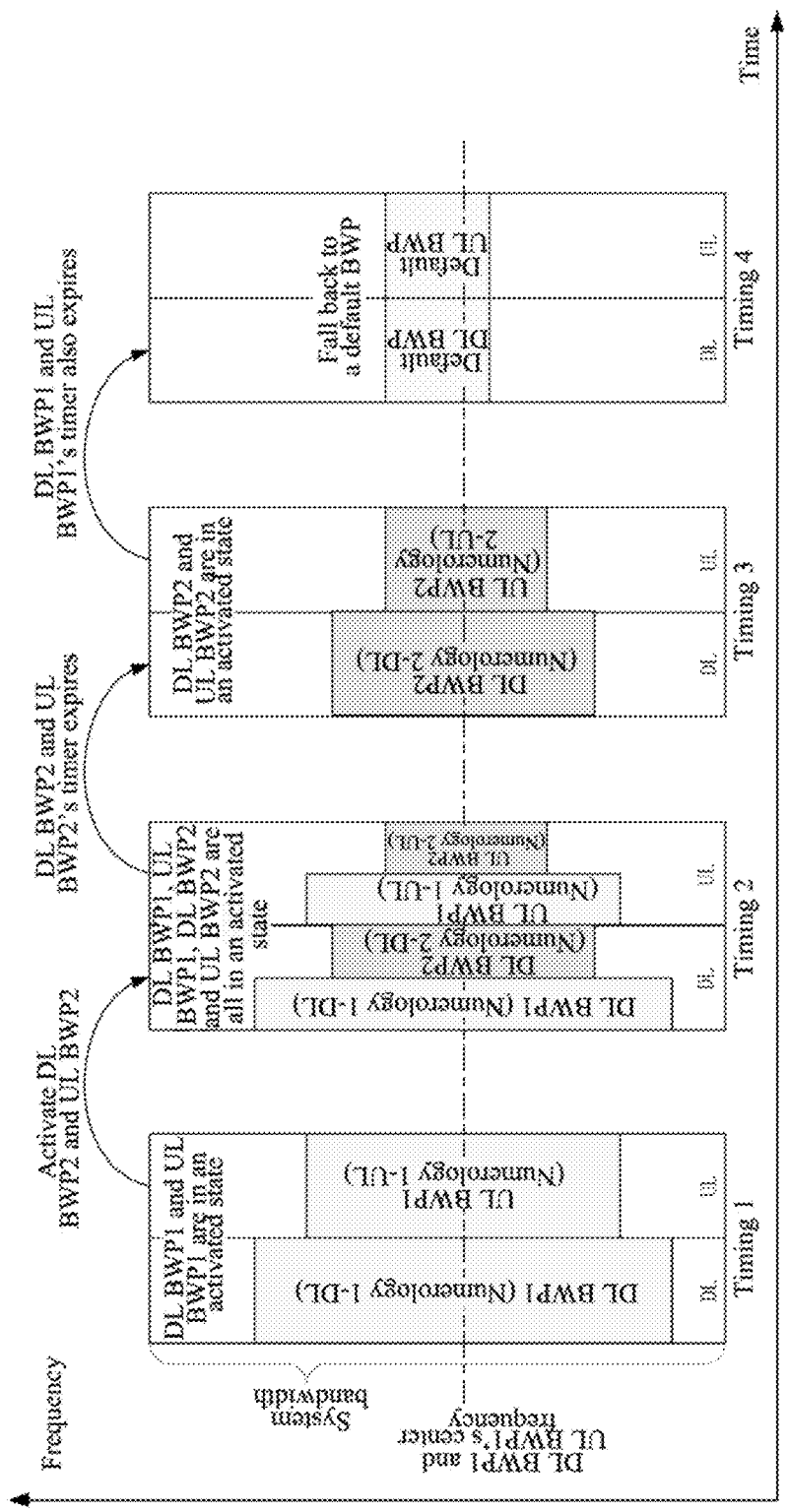
FIG. 7 is a schematic diagram of Example 4 of the present application.

As shown in FIG. 7, unlike the scheme in the prior art, when DL BWP1 and UL BWP1 are in an activated state, if DL BWP2 and UL BWP2 are activated, since DL BWP2 is consistent with DL BWP1 in terms of a center frequency and DL BWP2 has a bandwidth less than that of DL BWP1, and UL BWP2 is consistent with UL BWP1 in terms of a center frequency and UL BWP2 has a bandwidth less than that of UL BWP1, the terminal's radio frequency bandwidth and center frequency can still not be adjusted, thus DL BWP1 and UL BWP 1 will not be deactivated, and DL BWP1, UL BWP 1, DL BWP2 and UL BWP2 are all in an activated state. Different from Example 3, in this example, DL BWP1 and UL BWP 1 are deactivated before DL BWP2 and UL BWP2 (for instance, the timer for DL BWP1 and UL BWP1 expires), then enter a state where only DL BWP2 and UL BWP 2 are activated. When DL BWP2 and UL BWP2 are also deactivated (for instance, the timer for DL BWP2 and UL BWP2 expires), they will fall back to a default DL BWP and a default UL BWP.

With the new technical solution, two numerologies and/or two bandwidths can be supported simultaneously without adjusting the terminal's radio frequency bandwidth and center frequency, thereby flexibly supporting simultaneous transmission of multiple types of services, and improving scheduling flexibility and spectrum utilization of the system.

Example 5: DL BWP1 is not Consistent with DL
BWP2 in Terms of a Center Frequency but a
Frequency Domain Range of DL BWP2 is within a
Frequency Domain Range of DL BWP1, UL BWP1
is not Consistent with UL BWP2 in Terms of a
Center Frequency but a Frequency Domain Range
of UL BWP2 is within a Frequency Domain Range
of UL BWP1, and BWP2 is Deactivated Before
BWP1

Figure 8:
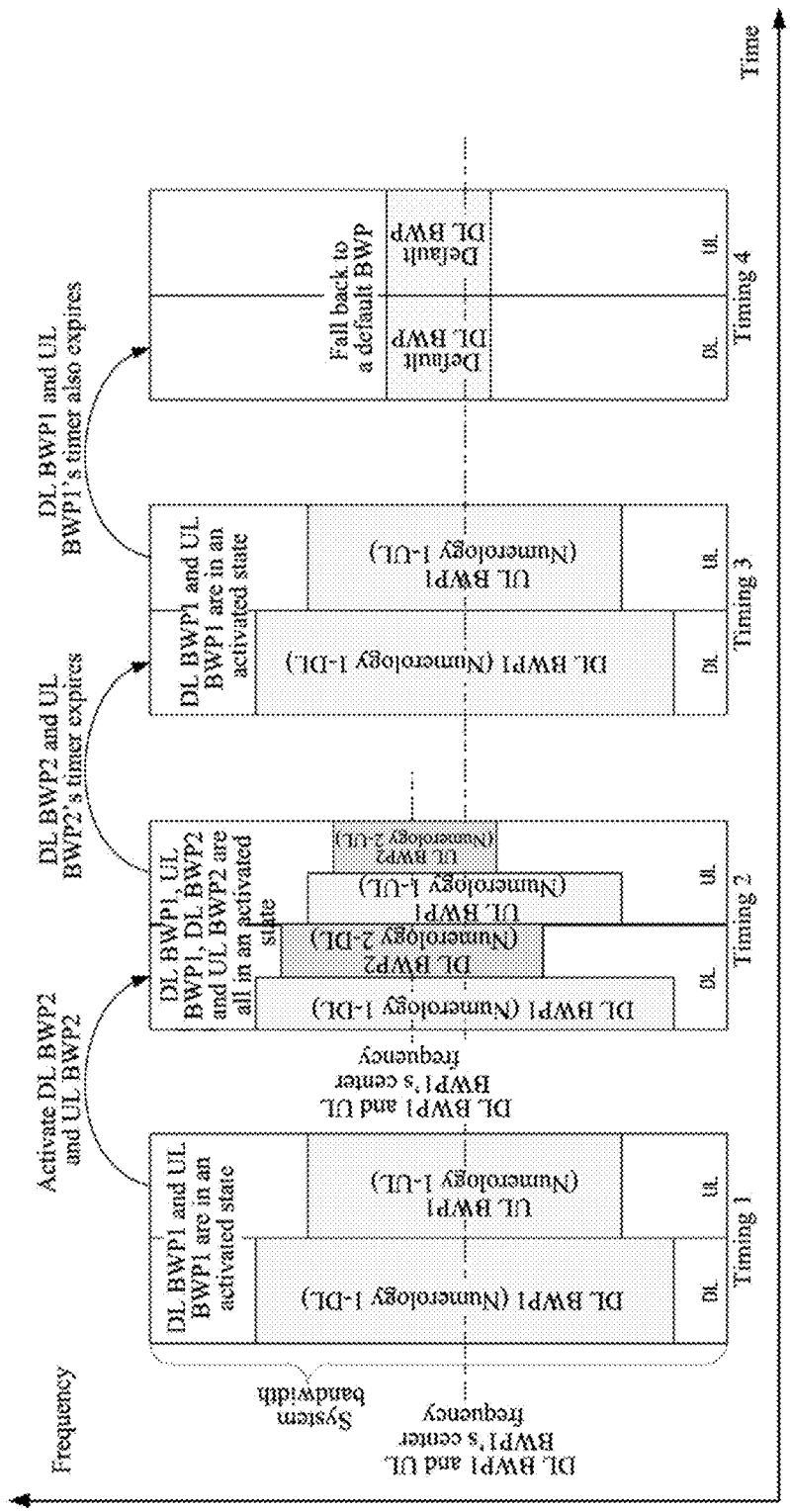
FIG. 8 is a schematic diagram of Example 5 of the present application.

As shown in FIG. 8, unlike the scheme in the prior art, when DL BWP1 and UL BWP1 are in an activated state, if DL BWP2 and UL BWP2 are activated, although DL BWP2 is not consistent with DL BWP1 in terms of a center frequency, a frequency domain range of DL BWP2 is within a frequency domain range of DL BWP1 and a frequency domain range of UL BWP2 is within a frequency domain range of UL BWP1, the terminal's radio frequency bandwidth and center frequency can still not be adjusted, thus DL BWP1 and UL BWP1 will not be deactivated, and DL BWP1, UL BWP 1, DL BWP2 and UL BWP2 are all in an activated state. When DL BWP2 and UL BWP2 are deactivated (for instance, the timer for DL BWP2 and UL BWP2 expires), enter a state where only DL BWP1 and UL BWP1 are activated. When DL BWP1 and UL BWP1 are also deactivated (for instance, the timer for DL BWP1 and UL BWP1 expires), they will fall back to a default DL BWP and a default UL BWP.

With the new technical solution, two numerologies and/or two bandwidths can be supported simultaneously without adjusting the terminal's radio frequency bandwidth and center frequency, thereby flexibly supporting simultaneous transmission of multiple types of services, and improving scheduling flexibility and spectrum utilization of the system.

Example 6: DL BWP1 is not Consistent with DL
BWP2 in Terms of a Center Frequency but a
Frequency Domain Range of DL BWP2 is within a
Frequency Domain Range of DL BWP1, UL BWP1
is not Consistent with UL BWP2 in Terms of a
Center Frequency but a Frequency Domain Range
of UL BWP2 is within a Frequency Domain Range
of UL BWP1, and BWP1 is Deactivated Before
BWP2

Figure 9:
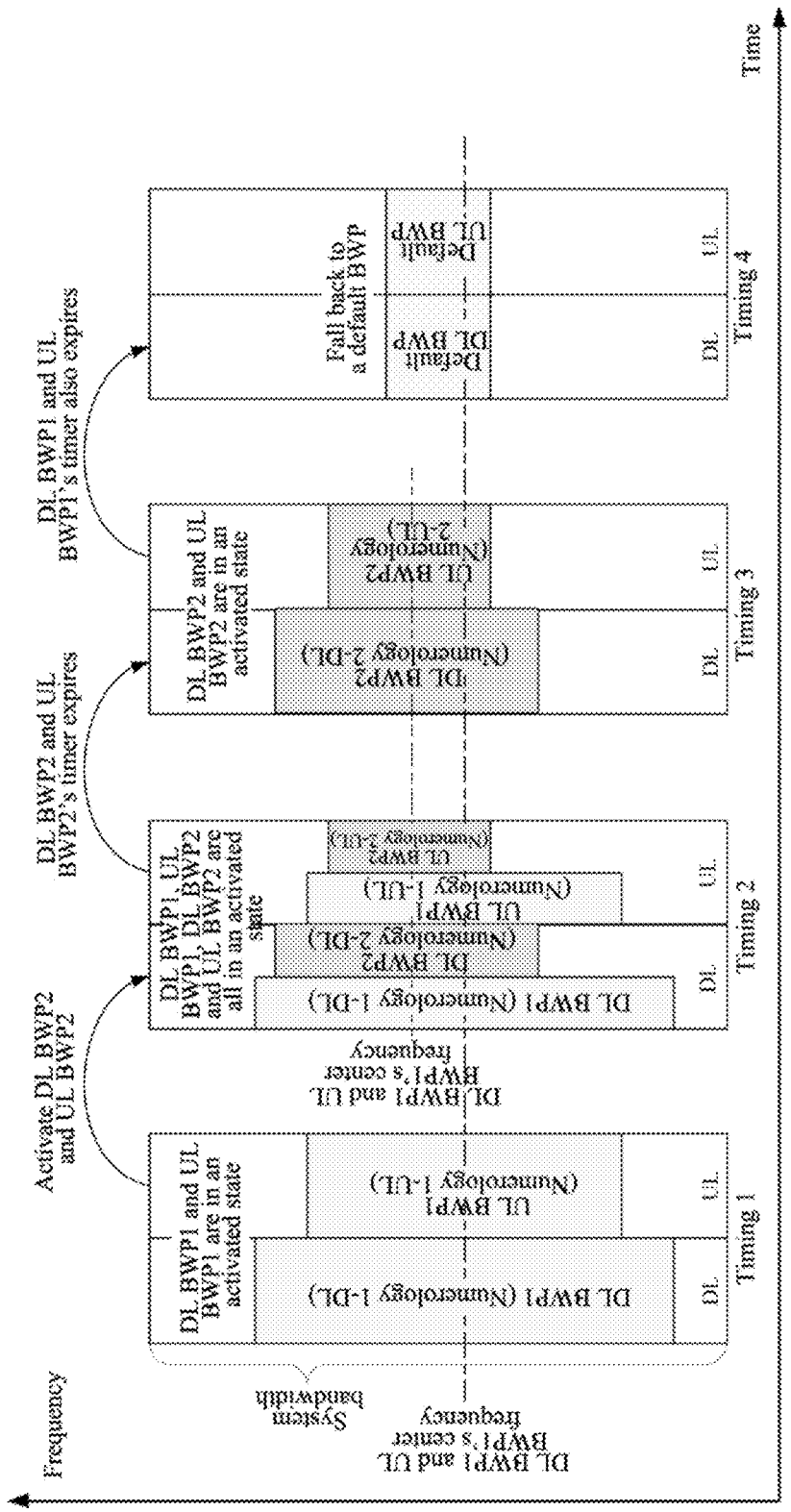
FIG. 9 is a schematic diagram of Example 6 of the present application.

As shown in FIG. 9, unlike the scheme in the prior art, when DL BWP1 and UL BWP1 are in an activated state, if DL BWP2 and UL BWP2 are activated, although DL BWP2 is not consistent with DL BWP1 in terms of a center frequency, a frequency domain range of DL BWP2 is within a frequency domain range of DL BWP1 and a frequency domain range of UL BWP2 is within a frequency domain range of UL BWP1, the terminal's radio frequency bandwidth and center frequency can still not be adjusted, thus DL BWP1 and UL BWP1 will not be deactivated, and DL BWP1, UL BWP 1, DL BWP2 and UL BWP2 are all in an activated state. Different from Example 5, in this example, DL BWP1 and UL BWP 1 are deactivated before DL BWP2 and UL BWP2 (for instance, the timer for DL BWP1 and UL BWP1 expires), then enter a state where only DL BWP2 and UL BWP2 are activated. When DL BWP2 and UL BWP2 are also deactivated (for instance, the timer for DL BWP2 and UL BWP2 expires), they will fall back to a default DL BWP and a default UL BWP.

With the new technical solution, two numerologies and/or two bandwidths can be supported simultaneously without adjusting the terminal's radio frequency bandwidth and center frequency, thereby flexibly supporting simultaneous transmission of multiple types of services, and improving scheduling flexibility and spectrum utilization of the system.

Example 7: Only One DL BWP2 is Simultaneously Activated with DL BWP1 and UL BWP1

Figure 10:
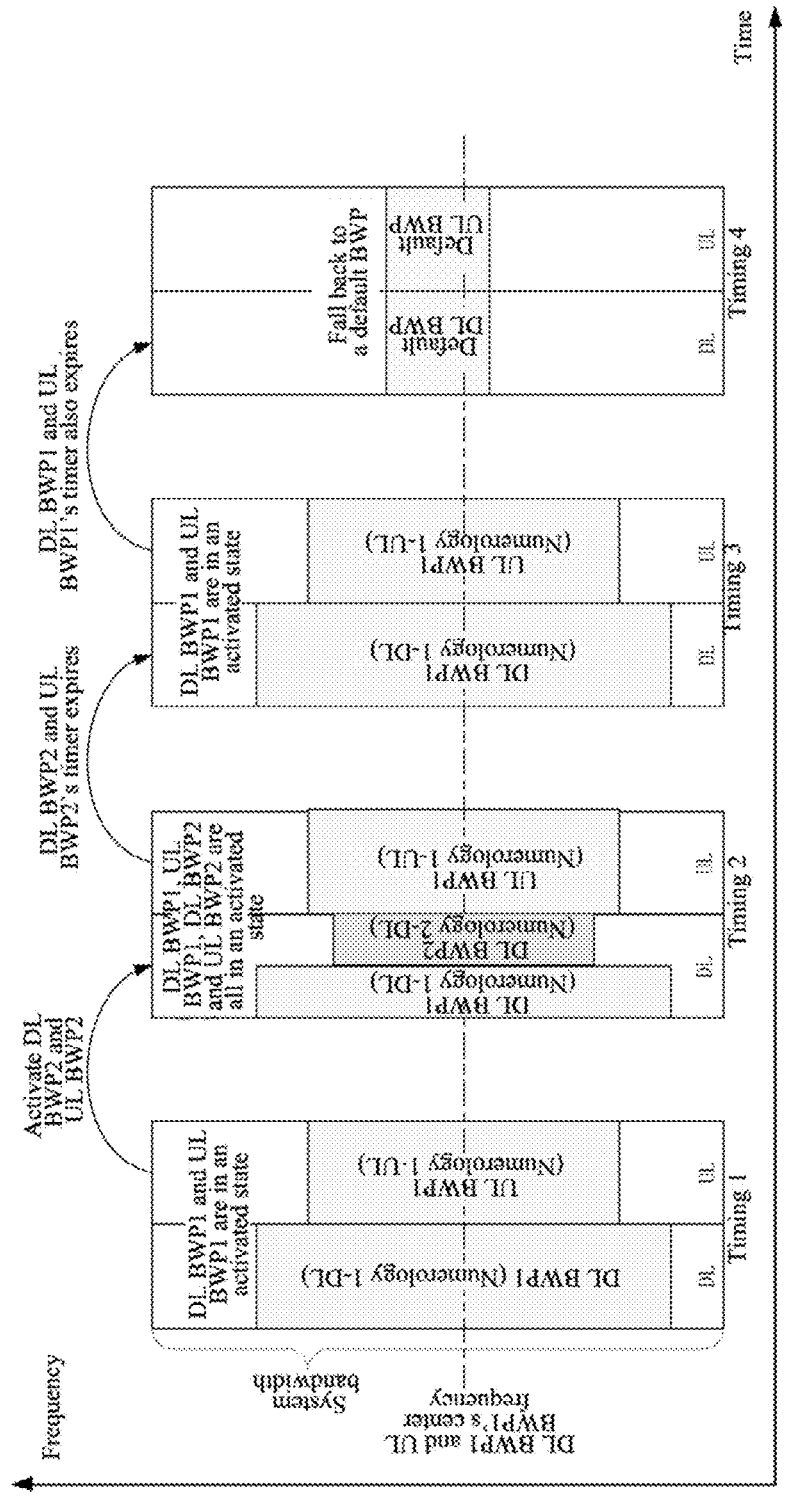
FIG. 10 is a schematic diagram of Example 7 of the present application.

As shown in FIG. 10, different from Example 3, when DL BWP1 and UL BWP1 are in an activated state, only one activated downlink BWP, i.e., DL BWP2, is added. DL BWP1 and UL BWP1 are activated in pairs, UL BWP2 may not be activated with DL BWP2 in pairs.

Example 8: Only One UL BWP2 is Simultaneously Activated with DL BWP1 and UL BWP1

Figure 11:
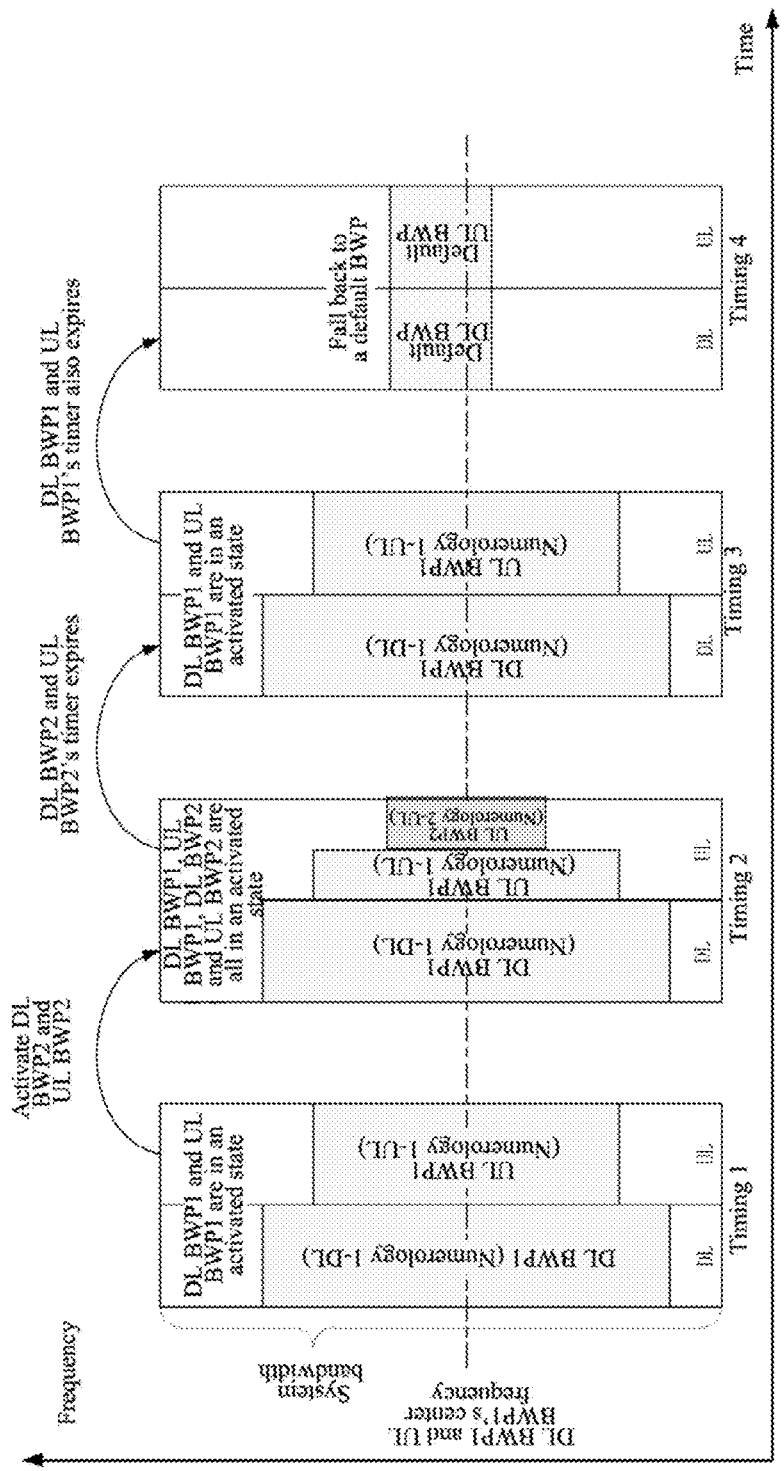
FIG. 11 is a schematic diagram of Example 8 of the present application.

As shown in FIG. 11, different from Example 4, when DL BWP1 and UL BWP1 are in an activated state, only one activated uplink BWP, i.e., UL BWP2, is added. Since DL BWP1 and UL BWP1 are activated in pairs, DL BWP2 may not be activated with UL BWP2 in pairs.

Figure 12:
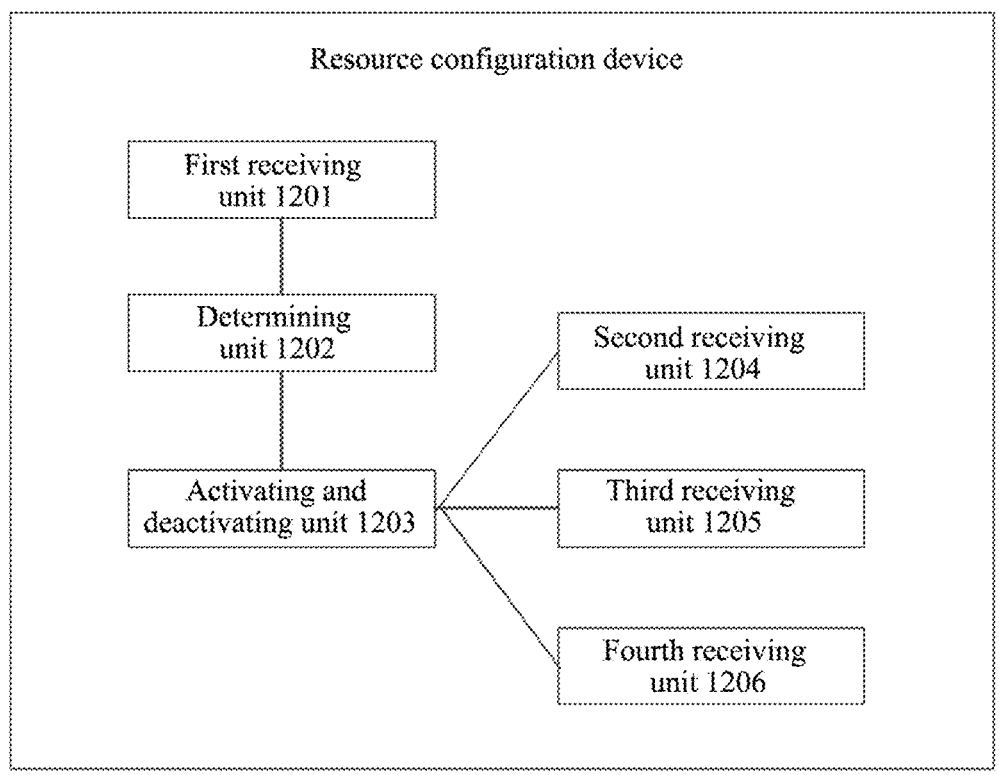
FIG. 12 is a first schematic diagram showing structural composition of a resource configuration device according to an embodiment of the present application.

FIG. 12 is a first schematic diagram showing structural composition of a resource configuration device according to an embodiment of the present application. As shown in FIG. 12, the resource configuration device includes:

a first receiving unit 1201, configured to receive first control information transmitted by a network device, where a BWP which is currently activated by a terminal includes a first downlink BWP and a first uplink BWP, and the first control information includes first indication information which is used to indicate that a BWP to be activated is a second downlink BWP or a second uplink BWP;

a determining unit 1202, configured to determine whether the first downlink BWP, the first uplink BWP, the second downlink BWP and the second uplink BWP are simultaneously activatable; and an activating and deactivating unit 1203, configured to: if the first downlink BWP, the first uplink BWP, the second downlink BWP and the second uplink BWP are simultaneously activatable, maintain the first downlink BWP and the first uplink BWP in an activated state while activating the second downlink BWP and the second uplink BWP.

In an implementation, the activating and deactivating unit 1203 is further configured to: if the first downlink BWP, the first uplink BWP, the second downlink BWP and the second uplink BWP are simultaneously unactivatable, deactivate the first downlink BWP and the first uplink BWP while activating the second downlink BWP and the second uplink BWP.

In an implementation, the determining unit 1202 is configured to: if the first downlink BWP, the first uplink BWP, the second downlink BWP, and the second uplink BWP satisfy a predetermined rule, determine that the first downlink BWP, the first uplink BWP, the second downlink BWP and the second uplink BWP are simultaneously activatable; if the first downlink BWP, the first uplink BWP, the second downlink BWP, and the second uplink BWP fail to satisfy a predetermined rule, determine that the first downlink BWP, the first uplink BWP, the second downlink BWP and the second uplink BWP are simultaneously unactivatable.

In an implementation, the first downlink BWP, the first uplink BWP, the second downlink BWP, and the second uplink BWP satisfy a predetermined rule, including:

the first downlink BWP is consistent with the second downlink BWP in terms of a center frequency and a bandwidth size, and the first uplink BWP is consistent with the second uplink BWP in terms of a center frequency and a bandwidth size; or, a frequency domain range of the second downlink BWP is within a frequency domain range of the first downlink BWP, and a frequency domain range of the second uplink BWP is within a frequency domain range of the first uplink BWP; or, the terminal has a radio frequency bandwidth capability capable of simultaneously covering frequency domain ranges of the first downlink BWP, the first uplink BWP, the second downlink BWP and the second uplink BWP.

In an implementation, the device further includes:

a second receiving unit 1204, configured to receive second control information transmitted by a network device, where the second control information includes second indication information which indicates whether the first downlink BWP, the first uplink BWP, the second downlink BWP and the second uplink BWP are simultaneously activatable;

the determining unit 1202 is configured to determine, based on the second control information, whether the first downlink BWP, the first uplink BWP, the second downlink BWP and the second uplink BWP are simultaneously activatable.

In an implementation, the second control information is DCI, or RRC signaling, or SI.

In an implementation, the device further includes:

a third receiving unit 1205, configured to receive first configuration information transmitted by the network device, where the first configuration information includes first duration information corresponding to the first downlink BWP and the first uplink BWP and/or second duration information corresponding to the second downlink BWP and the second uplink BWP; where the first duration information is used to enable the terminal to deactivate the first downlink BWP and the first uplink BWP when a duration in which the first downlink BWP and the first uplink BWP are activated reaches the first duration; and the second duration information is used to enable the terminal to deactivate the second downlink BWP and the second uplink BWP when a duration in which the second downlink BWP and the second uplink BWP are activated reaches the second duration;

the activating and deactivating unit 1203 is further configured to deactivate, based on the first configuration information, the first downlink BWP and the first uplink BWP, and/or deactivate the second downlink BWP and the second uplink BWP.

In an implementation, the device further includes:

a fourth receiving unit 1206, configured to receive third control information transmitted by the network device, where the third control information includes third indication information which is used to indicate that a BWP to be deactivated includes the first downlink BWP and the first uplink BWP, and/or, the second downlink BWP and the second uplink BWP;

the activating and deactivating unit 1203 is further configured to deactivate, based on the third control information, the first downlink BWP and the first uplink BWP, and/or deactivate the second downlink BWP and the second uplink BWP.

In an implementation, the activating and deactivating unit 1203 is further configured to: when the first downlink BWP, the first uplink BWP, the second downlink BWP and the second uplink BWP are deactivated, activate a default BWP.

Those skilled in the art should understand that the implement functionality of each unit in the resource configuration device shown in FIG. 12 can be understood with reference to the related description of the foregoing resource configuration method. The function of each unit in the resource configuration device shown in FIG. 12 may be implemented by a program running on a processor, or may be implemented by a specific logic circuit.

Figure 13:
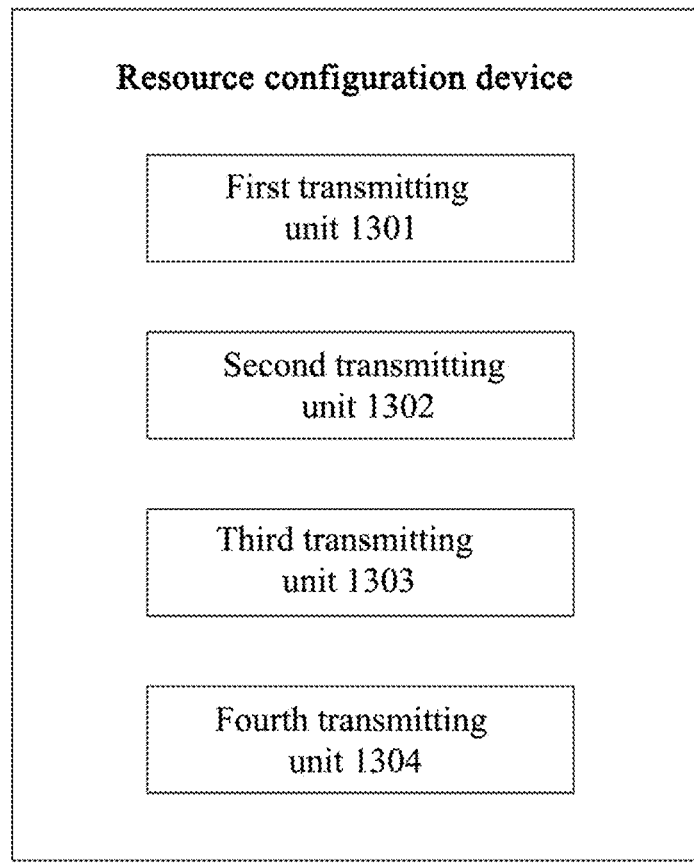
FIG. 13 is a second schematic diagram showing structural composition of a resource configuration device according to an embodiment of the present application.

FIG. 13 is a second schematic diagram showing structural composition of a resource configuration device according to an embodiment of the present application. As shown in FIG. 13, the resource configuration device includes:

a first transmitting unit 1301, configured to transmit first control information to a terminal, where a BWP which is currently activated by the terminal includes a first downlink BWP and a first uplink BWP, and the first control information includes first indication information which is used to indicate that a BWP to be activated is a second downlink BWP or a second uplink BWP, so that when it is determined that the first downlink BWP, the first uplink BWP, the second downlink BWP and the second uplink BWP are simultaneously activatable, the terminal maintains the first downlink BWP and the first uplink BWP in an activated state while activating the second downlink BWP and the second uplink BWP.

In an implementation, if the first downlink BWP, the first uplink BWP, the second downlink BWP and the second uplink BWP are simultaneously unactivatable, the first indication information is used to enable the terminal to deactivate the first downlink BWP and the first uplink BWP while activating the second downlink BWP and the second uplink BWP.

In an implementation, whether the first downlink BWP, the first uplink BWP, the second downlink BWP and the second uplink BWP are simultaneously activatable, including:

if the first downlink BWP, the first uplink BWP, the second downlink BWP, and the second uplink BWP satisfy a predetermined rule, the first downlink BWP, the first uplink BWP, the second downlink BWP and the second uplink BWP are simultaneously activatable;

if the first downlink BWP, the first uplink BWP, the second downlink BWP, and the second uplink BWP fail to satisfy a predetermined rule, the first downlink BWP, the first uplink BWP, the second downlink BWP and the second uplink BWP are simultaneously unactivatable.

In an implementation, the first downlink BWP, the first uplink BWP, the second downlink BWP, and the second uplink BWP satisfy a predetermined rule, including:

the first downlink BWP is consistent with the second downlink BWP in terms of a center frequency and a bandwidth size, and the first uplink BWP is consistent with the second uplink BWP in terms of a center frequency and a bandwidth size; or, a frequency domain range of the second downlink BWP is within a frequency domain range of the first downlink BWP, and a frequency domain range of the second uplink BWP is within a frequency domain range of the first uplink BWP; or, the terminal has a radio frequency bandwidth capability capable of simultaneously covering frequency domain ranges of the first downlink BWP, the first uplink BWP, the second downlink BWP and the second uplink BWP.

In an implementation, the device further includes:

a second transmitting unit 1302, configured to transmit second control information to the terminal, where the second control information includes second indication information which indicates whether the first downlink BWP, the first uplink BWP, the second downlink BWP and the second uplink BWP are simultaneously activatable.

In an implementation, the second control information is DCI, or RRC signaling, or SI.

In an implementation, the device further includes:

a third transmitting unit 1303, configured to transmit first configuration information to the terminal, where the first configuration information includes first duration information corresponding to the first downlink BWP and the first uplink BWP and/or second duration information corresponding to the second downlink BWP and the second uplink BWP; where the first duration information is used to enable the terminal to deactivate the first downlink BWP and the first uplink BWP when a duration in which the first downlink BWP and the first uplink BWP are activated reaches the first duration; and the second duration information is used to enable the terminal to deactivate the second downlink BWP and the second uplink BWP when a duration in which the second downlink BWP and the second uplink BWP are activated reaches the second duration.

In an implementation, the device further includes:

a fourth transmitting unit 1304, configured to transmit third control information to the terminal, where the third control information includes third indication information which is used to indicate that a BWP to be deactivated includes the first downlink BWP and the first uplink BWP, and/or, the second downlink BWP and the second uplink BWP.

Those skilled in the art should understand that the implement functionality of each unit in the resource configuration device shown in FIG. 13 can be understood with reference to the related description of the foregoing resource configuration method. The function of each unit in the resource configuration device shown in FIG. 13 may be implemented by a program running on a processor, or may be implemented by a specific logic circuit.

When a resource configuration device described above in an embodiment of the present application is implemented in a form of a software functional module and sold or used as an independent product, the resource configuration device may also be stored in a computer-readable storage medium. Based on such understanding, the technical solutions in the embodiments of the present application essentially, or the part contributing to the prior art may be embodied in a form of a software product. The computer software product is stored in a storage medium, and includes several instructions enabling a computer device (which may be a personal computer, a server, or a network device) to perform all or a part of the methods described in the embodiments of the present application. The foregoing storage medium includes:

any medium capable of storing program codes, such as a USB flash disk, a mobile hard disk, a read only memory (ROM, Read Only Memory), a magnetic disk, or an optical disc. In this way, the embodiments of the present application are not limited to any particular combination of hardware and software.

Correspondingly, an embodiment of the present application further provides a computer storage medium stored with computer-executable instructions, where the computer-executable instructions, when executed by a processor, implement a resource configuration method described above in an embodiment of the present application.

Figure 14:
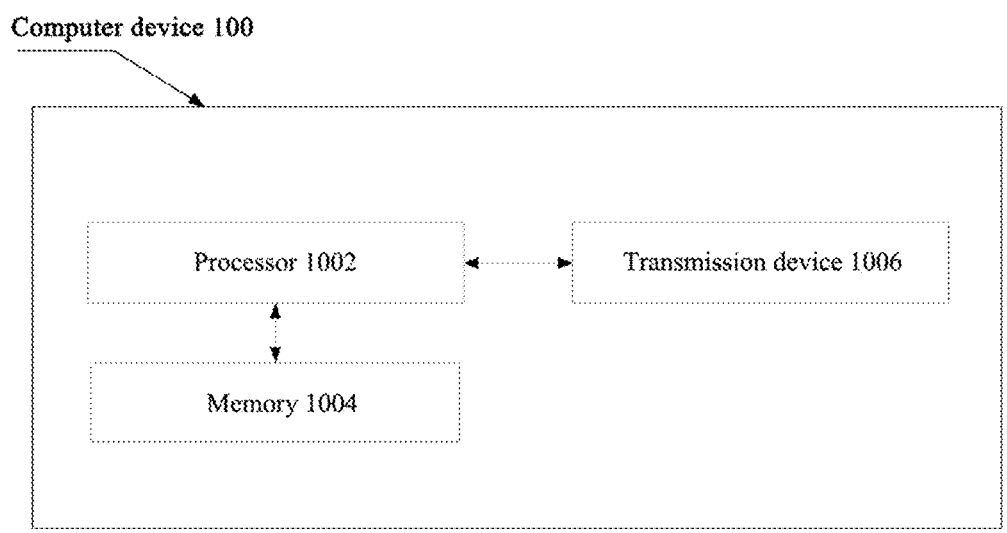
FIG. 14 is a schematic diagram showing structural composition of a computer device according to an embodiment of the present application.

FIG. 14 is a schematic diagram showing structural composition of a computer device according to an embodiment of the present application. The computer device may be a terminal or a network device. As shown in FIG. 14, the computer device 100 may include one or more (only one is shown in the figure) processors 1002 (the processor 1002 may include but not limited to a processing device such as a micro processor (MCU, Micro Controller Unit) or a programmable logic device (FPGA, Field Programmable Gate Array), a memory 1004 for storing data, and a transmission device 1006 for a communication function. Persons of ordinary skill in the art may understand that the structure shown in FIG. 14 is merely an illustration, and it does not limit the structure of the above electronic device. For instance, the computer device 100 may also include more or fewer components than those shown in FIG. 14 or have a configuration different from that shown in FIG. 14.

The memory 1004 may be configured to store software programs and modules of application software, such as program instructions/modules corresponding to the methods in the embodiments of the present application. The processor 1002 executes various functional applications and data processing by running the software programs and modules stored in the memory 1004, that is, implements the above methods. The memory 1004 may include a high-speed random access memory, and may further include a non-volatile memory, such as one or more magnetic storage devices, flash memories, or other non-volatile solid-state memories. In some examples, the memory 1004 may further include memories remotely provided with respect to the processor 1002, and these remote memories may be connected to the computer device 100 through a network. Examples of the above network include but are not limited to Internet, an intranet, a local area network, a mobile communication network, and a combination thereof.

The transmission device 1006 is configured to receive or transmit data via a network. A specific example of the network described above may include a wireless network provided by a communication provider of the computer device 100. In one example, the transmission device 1006 includes a network adapter (NIC, Network Interface Controller), which can be connected to other network devices through a base station for communications with the Internet. In one example, the transmission device 1006 may be a radio frequency (RF, Radio Frequency) module, which is configured to communicate with the Internet wirelessly.

The technical solutions described in the embodiments of the present application may be arbitrarily combined without conflict.

In several embodiments provided in the present application, it should be understood that the disclosed methods and smart devices may be implemented in other manners. The device embodiments described above are merely exemplary. For instance, the division of the units is merely the division of logical functions and there may be other divisions during actual implementations. For instance, multiple units or components may be combined or integrated into another system, or some features may be omitted or not performed. In addition, the presented or discussed mutual couplings or direct couplings or communication connections between respective components may be implemented through some interfaces. The indirect couplings or communication connections between the devices or units may be implemented in electronic, mechanical, or other forms.

The units described as separate parts may or may not be physically separate, and parts shown as units may or may not be physical units, that is, may be located in one position, or may be distributed on multiple network units. A part or all of the units may be selected according to actual needs to achieve the objectives of the schemes in the embodiments.

In addition, functional units in the embodiments of the present application may all be integrated into a second processing unit, or each of the units may be separately used as a unit, or two or more units are integrated into one unit; the above integrated unit can be implemented in the form of hardware, or in the form of hardware plus software functional units.

The above descriptions are merely specific embodiments of the present application; however, the protection scope of the present application is not limited thereto. Any modification or replacement that may be readily envisaged of by persons skilled in the art within the technical scope disclosed in the present application should fall into the protection scope of the present application.

What claimed is:

1. A resource configuration method, comprising:
   receiving, by a terminal, first control information transmitted by a network device, wherein a bandwidth part (BWP) which is currently activated by the terminal comprises a first downlink BWP and a first uplink BWP, and the first control information comprises first indication information which is used to indicate that a BWP to be activated is a second downlink BWP or a second uplink BWP; and
   determining, by the terminal, whether the first downlink BWP, the first uplink BWP, the second downlink BWP and the second uplink BWP are simultaneously activatable, if the first downlink BWP, the first uplink BWP, the second downlink BWP and the second uplink BWP are simultaneously activatable, maintaining, by the terminal, the first downlink BWP and the first uplink BWP in an activated state while activating the second downlink BWP and the second uplink BWP;
   wherein the determining, by the terminal, whether the first downlink BWP, the first uplink BWP, the second downlink BWP and the second uplink BWP are simultaneously activatable comprises:
   if the first downlink BWP, the first uplink BWP, the second downlink BWP, and the second uplink BWP satisfy a predetermined rule, determining, by the terminal, that the first downlink BWP, the first uplink BWP, the second downlink BWP and the second uplink BWP are simultaneously activatable;
   if the first downlink BWP, the first uplink BWP, the second downlink BWP, and the second uplink BWP fail to satisfy a predetermined rule, determining, by the terminal, that the first downlink BWP, the first uplink BWP, the second downlink BWP and the second uplink BWP are simultaneously unactivatable;
   wherein the first downlink BWP, the first uplink, BWP, the second downlink BWP, and the second uplink BWP satisfy a predetermined rule comprises:

the first downlink BWP is consistent with the second downlink BWP in terms of a center frequency and a bandwidth size, and the first uplink BWP is consistent with the second uplink BWP in terms of a center frequency and a bandwidth size; or, a frequency domain range of the second downlink BWP is within a frequency domain range of the first downlink BWP, and a frequency domain range of the second uplink BWP is within a frequency domain range of the first uplink BWP; or, the terminal has a radio frequency bandwidth capability capable of simultaneously covering frequency domain ranges of the first downlink BWP, the first uplink BWP, the second downlink BWP and the second uplink BWP.

2. The method according to claim 1, further comprising:
if the first downlink BWP, the first uplink BWP, the second downlink BWP and the second uplink BWP are simultaneously unactivatable, deactivating, by the terminal, the first downlink BWP and the first uplink BWP while activating the second downlink BWP and the second uplink BWP.

3. The method according to claim 1, further comprising:
receiving, by the terminal, first configuration information transmitted by the network device, wherein the first configuration information comprises at least one of first duration information corresponding to the first downlink BWP and the first uplink BWP and second duration information corresponding to the second downlink BWP and the second uplink BWP; wherein the first duration information is used to enable the terminal to deactivate the first downlink BWP and the first uplink BWP when a duration in which the first downlink BWP and the first uplink BWP are activated reaches the first duration; and the second duration information is used to enable the terminal to deactivate the second downlink BWP and the second uplink BWP when a duration in which the second downlink BWP and the second uplink BWP are activated reaches the second duration; and based on the first configuration information, deactivating, by the terminal, the first downlink BWP and the first uplink BWP, and/or deactivating the second downlink BWP and the second uplink BWP.

4. The method according to claim 1, further comprising:
receiving, by the terminal, third control information transmitted by the network device, wherein the third control information comprises third indication information which is used to indicate that a BWP to be deactivated comprises the first downlink BWP and the first uplink BWP, and/or, the second downlink BWP and the second uplink BWP; and based on the third control information, deactivating, by the terminal, the first downlink BWP and the first uplink BWP, and/or deactivating the second downlink BWP and the second uplink BWP.

5. The method according to claim 3, further comprising:
when the first downlink BWP, the first uplink BWP, the second downlink BWP and the second uplink BWP are deactivated, activating a default BWP.

6. A resource configuration device, comprising at least one processor, a memory and a transmission device, wherein one or more programs are stored in the memory and configured to be executed by the processor, and the program comprises instructions for performing the following steps:
receiving first control information transmitted by a network device, wherein a bandwidth part (BWP) which is currently activated by a terminal comprises a first downlink BWP and a first uplink BWP, and the first control information comprises first indication information which is used to indicate that a BWP to be activated is a second downlink BWP or a second uplink BWP;

determining whether the first downlink BWP, the first uplink BWP, the second downlink BWP and the second uplink BWP are simultaneously activatable; and if the first downlink BWP, the first uplink BWP, the second downlink BWP and the second uplink BWP are simultaneously activatable, maintaining the first downlink BWP and the first uplink BWP in an activated state while activating the second downlink BWP and the second uplink BWP;

wherein the program further comprises instructions for performing the following steps:
if the first downlink BWP, the first uplink BWP, the second downlink BWP, and the second uplink BWP satisfy a predetermined rule, determining that the first downlink BWP, the first uplink BWP, the second downlink BWP and the second uplink BWP are simultaneously activatable;

if the first downlink BWP, the first uplink BWP, the second downlink BWP, and the second uplink BWP fail to satisfy a predetermined rule, determining that the first downlink BWP, the first uplink BWP, the second downlink BWP and the second uplink BWP are simultaneously unactivatable;

wherein the first downlink BWP, the first uplink BWP, the second downlink BWP, and the second uplink BWP satisfy a predetermined rule comprises:
the first downlink BWP is consistent with the second downlink BWP in terms of a center frequency and a bandwidth size, and the first uplink BWP is consistent with the second uplink BWP in terms of a center frequency and a bandwidth size; or, a frequency domain range of the second downlink BWP is within a frequency domain range of the first downlink BWP, and a frequency domain range of the second uplink BWP is within a frequency domain range of the first uplink BWP; or, the terminal has a radio frequency bandwidth capability cable of simultaneously covering frequency domain ranges of the first downlink BWP, the first uplink BWP, the second downlink BWP and the second uplink BWP.

7. The device according to claim 6, wherein the program further comprises instructions for performing the following step:
if the first downlink BWP, the first uplink BWP, the second downlink BWP and the second uplink BWP are simultaneously unactivatable, deactivating the first downlink BWP and the first uplink BWP while activating the second downlink BWP and the second uplink BWP.

8. The device according to claim 6, wherein the program further comprises instructions for performing the following steps:
receiving first configuration information transmitted by the network device, wherein the first configuration information comprises at least one of first duration information corresponding to the first downlink BWP and the first uplink BWP and second duration information corresponding to the second downlink BWP and the second uplink BWP; wherein the first duration information is used to enable the terminal to deactivate the first downlink BWP and the first uplink BWP when a duration in which the first downlink BWP and the first uplink BWP are activated reaches the first duration; and the second duration information is used to enable the terminal to deactivate the second downlink BWP and the second uplink BWP when a duration in which the second downlink BWP and the second uplink BWP are activated reaches the second duration;

deactivating, based on the first configuration information, the first downlink BWP and the first uplink BWP, and/or deactivate the second downlink BWP and the second uplink BWP.

9. The device according to claim 6, wherein the program further comprises instructions for performing the following steps:

receiving third control information transmitted by the network device, wherein the third control information comprises third indication information which is used to indicate that a BWP to be deactivated comprises the first downlink BWP and the first uplink BWP, and/or, the second downlink BWP and the second uplink BWP;

deactivating, based on the third control information, the first downlink BWP and the first uplink BWP, and/or deactivate the second downlink BWP and the second uplink BWP.

10. The device according to claim 8, wherein the program further comprises instructions for performing the following step:

when the first downlink BWP, the first uplink BWP, the second downlink BWP and the second uplink BWP are deactivated, activating a default BWP.

11. A resource configuration device, comprising at least one processor, a memory and a transmission device, wherein one or more programs are stored in the memory and configured to be executed by the processor, and the program comprises instructions for performing the following steps:

transmitting first control information to a terminal, wherein a bandwidth part (BWP) which is currently activated by the terminal comprises a first downlink BWP and a first uplink BWP, and the first control information comprises first indication information which is used to indicate that a BWP to be activated is a second downlink BWP or a second uplink BWP, so that when it is determined that the first downlink BWP, the first uplink BWP, the second downlink BWP and the second uplink BWP are simultaneously activatable, the terminal maintains the first downlink BWP and the first uplink BWP in an activated state while activating the second downlink BWP and the second uplink BWP;

wherein if the first downlink BWP, the first uplink BWP, the second downlink BWP, and the second uplink BWP satisfy a redetermined, rule, the first downlink BWP, the first uplink BWP, the second downlink BWP and the second uplink BWP are simultaneously activatable;

if the first downlink BWP, the first uplink BWP, the second downlink BWP, and the second uplink BWP fail to satisfy a predetermined rule, the first downlink BWP, the first uplink BWP, the second downlink BWP and the second uplink BWP are simultaneously unactivatable;

wherein the first downlink BWP, the first uplink BWP, the second downlink BWP, and the second uplink BWP satisfy a predetermined rule comprises:

the first downlink BWP is consistent with the second downlink BWP in terms of a center frequency and a bandwidth size, and the first uplink BWP is consistent with the second uplink BWP in terms of a center frequency and a bandwidth size; or, a frequency domain range of the second downlink BWP is within a frequency domain range of the first downlink BWP, and a frequency domain range of the second uplink BWP is within a frequency domain range of the first uplink BWP; or, the terminal has a radio frequency bandwidth capability capable of simultaneously covering frequency domain ranges of the first downlink BWP, the first uplink BWP, the second downlink BWP and the second uplink BWP.

12. A non-transitory computer storage medium stored with computer-executable instructions, wherein the computer-executable instructions, when executed by a processor, implement a step of the method according to claim 1.

* * * * *